(12) United States Patent
Oyama et al.

(10) Patent No.: US 8,756,357 B2
(45) Date of Patent: Jun. 17, 2014

(54) DATA PROCESSOR AND CONTROL SYSTEM

(71) Applicant: Renesas Electronics Corporation, Kawasaki (JP)

(72) Inventors: Hidemi Oyama, Nanae (JP); Masanobu Kawamura, Kanagawa (JP); Takuya Ikeguchi, Kanagawa (JP); Masanori Matsumoto, Kanagawa (JP); Hiroyuki Kawajiri, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/924,398

(22) Filed: Jun. 21, 2013

(65) Prior Publication Data
US 2013/0283024 A1    Oct. 24, 2013

Related U.S. Application Data

(63) Continuation of application No. 13/527,312, filed on Jun. 19, 2012, now Pat. No. 8,489,788, which is a continuation of application No. 13/287,016, filed on Nov. 1, 2011, now Pat. No. 8,219,731, which is a continuation of application No. 12/886,766, filed on Sep. 21, 2010, now Pat. No. 8,074,005, which is a continuation of application No. 12/044,667, filed on Mar. 7, 2008, now Pat. No. 7,822,899.

(30) Foreign Application Priority Data

Mar. 8, 2007   (JP) ................. 2007-058574
Jan. 25, 2008  (JP) ................. 2008-014397

(51) Int. Cl.
G06F 13/24   (2006.01)
G06F 3/00    (2006.01)

(52) U.S. Cl.
USPC ...... 710/260; 710/5; 710/6; 710/58; 710/100; 710/267; 710/306

(58) Field of Classification Search
USPC .......................... 710/5, 6, 267, 306
See application file for complete search history.

(56) References Cited

U.S. PATENT DOCUMENTS 5,493,656 A    2/1996  Tsukamoto
5,579,531 A    11/1996 Sugita
(Continued)

FOREIGN PATENT DOCUMENTS

JP    64-055667 A    3/1989
JP    5-307617       11/1993
(Continued)

OTHER PUBLICATIONS

Office Action received in Chinese Application No. 200810083726.0 (and English translation).

(Continued)

*Primary Examiner* — Brian Misiura
(74) *Attorney, Agent, or Firm* — Miles & Stockbridge P.C.

(57) ABSTRACT

Provided are a data processor, and a control system, in which an interrupt controller and an event link controller are adopted. The event link controller responds to a generated event signal to output a start control signal for controlling start of an operation of a circuit module. The circuit module is able to generate an event signal. The event link controller generates the start control signal according to the correspondences between event signals and start control signals which are defined by event control information. The links between the event signals and start control signals can be prescribed by the event control information. Therefore, operations of circuit modules prescribed by such links can be controlled sequentially. The control neither involves save and return processes by CPU as in the interrupt processing, nor needs priority level control as executed on competing interrupt requests.

4 Claims, 27 Drawing Sheets

(56) References Cited

U.S. PATENT DOCUMENTS

| | | | |
|---|---|---|---|
| 5,646,983 A | 7/1997 | Suffern et al. | |
| 5,930,488 A | 7/1999 | Mitsuishi | |
| 6,218,971 B1 | 4/2001 | Sugihara | |
| 6,374,145 B1 | 4/2002 | Lignoul | |
| 6,826,705 B2 | 11/2004 | Tani | |
| 2008/0147949 A1 | 6/2008 | Miyake | |

FOREIGN PATENT DOCUMENTS

| | | | |
|---|---|---|---|
| JP | 07-105124 A | 4/1995 | |
| JP | 2003-271267 A | 9/2003 | |

OTHER PUBLICATIONS

Office Action from Japanese Patent Application No. 2008-014397 (and English translation).

Japanese Office Action dated Aug. 1, 2013, issued in counterpart Japanese Patent Application No. 2012-106487.

Issued Office Action dated Apr. 3, 2014, for Chinese Application No. 201110381951.4, with English language translation.

FIG. 3

| Circuit Module | Operation at the time of input of Start Event (Start Control Signal) | | |
|---|---|---|---|
| Timer or Timer-related Module | Count Start | | Start counting on input of an event |
| | Event Count | | Count the number of input events |
| | Input Capture | | Capture operation at the time of input of an event |
| A/D Converter | Start Analog-to-Digital Conversion | | Start Analog-to-Digital conversion at the time of input of an event |
| D/A Converter | Start Digital-to-Analog Conversion | | Start Digital-to-Analog conversion at the time of input of an event |
| SCI | Start Sending | | Sending-data writing by DTC |
| Output PORT(*) | Output a signal to an external terminal | Group | • Output a set value to an external terminal (Change in output can be specified) |
| | | Single | • Output a set value to an external terminal (Change in output can be specified) |
| Input PORT(*) | External Event (Change of Input Terminal) | Group | Cause an event |
| | | Single | Cause an event |
| | Internal Event (which arises in a chip) | Group | Transfer an input signal value to an internal register |
| DTC | Start Data Transfer | | Refer to transfer control data and begin data transfer control |

FIG. 4

| Circuit Module | Event that is caused |
|---|---|
| Timer or Timer-related Module | • Overflow<br>• Underflow<br>• Compare match |
| A/D Converter | • Completion of analog-to-Digital conversion |
| SCI | • Sending-data empty<br>• Receive data full |
| Output PORT | • Signal output to an external terminal |
| Input PORT | • An event is caused by the change in input signal. |
| IRQ | • Creation of a CPU interrupt request |
| DTC | • Completion of transfer |

FIG. 5

(Event Link Settings between Modules)

| Circuit module that has output an event signal | | | Circuit Module that a start event (start control signal) is input to | | | | | | | | | | |
|---|---|---|---|---|---|---|---|---|---|---|---|---|---|
| Name of Module (Function) | | Event created | TIM | WDT | RTC | PRT_IN | PRT_OUT | SCI | DTC | INT | A/D | D/A | CPG |
| Timer | TIM | Overflow | | | | | | | | | | | |
| | | Underflow | | | | | | | | | | | |
| | | Compare match | | | | | | | | | | | |
| Watchdog Timer | WDT | 1/2 and 3/4 Count-up | | | | | | | | | | | |
| | | Reset of Watchdog | | | | | | | | | | | |
| Timer serving as a timepiece | RTC | Periodic Interruption (in seconds, minutes, hours and days) | | | | | | | | | | | |
| Input port | PRT_IN | Creation of Event (at the time of change in signal at an input terminal) | | | | | | | | | L1 | | |
| Output Port | PRT_OUT | Signal output to an external terminal | | | | | | | | | | | |
| Serial Communication | | Completion of data Sending | | | | | | | | | | | |
| | | Completion of data reception | | | | | | | | | | | |
| Data Transfer Controller | DTC | Completion of data transfer | | | | | | | | | | | |
| Interrupt Control | INT | Interruption to CPU | | | | | | | | | | | |
| Analog-to-Digital Conversion | A/D | Completion of analog-to-digital conversion | | | | | L2 | | | | | | |

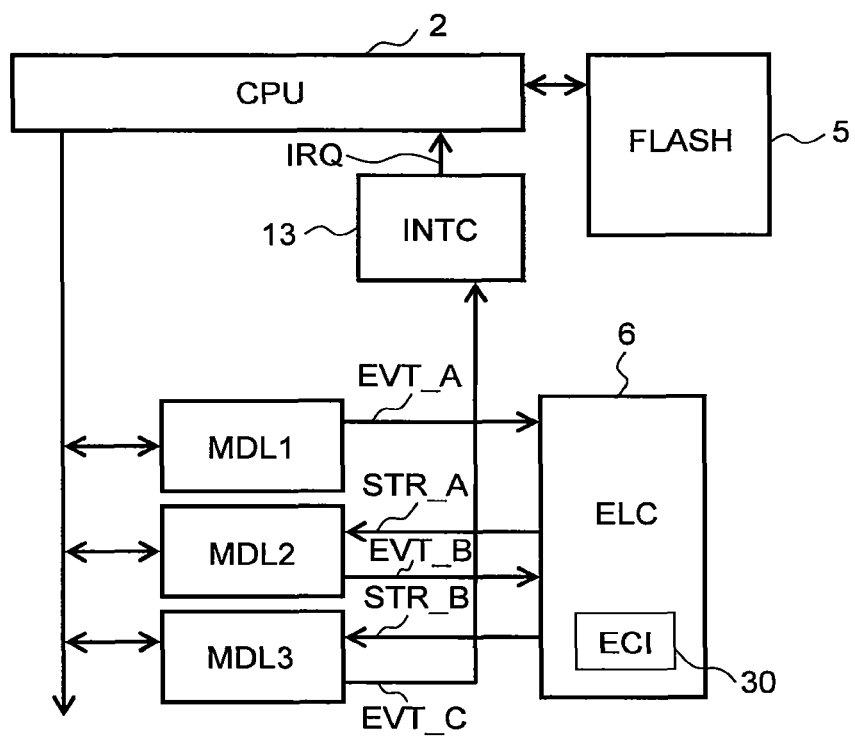

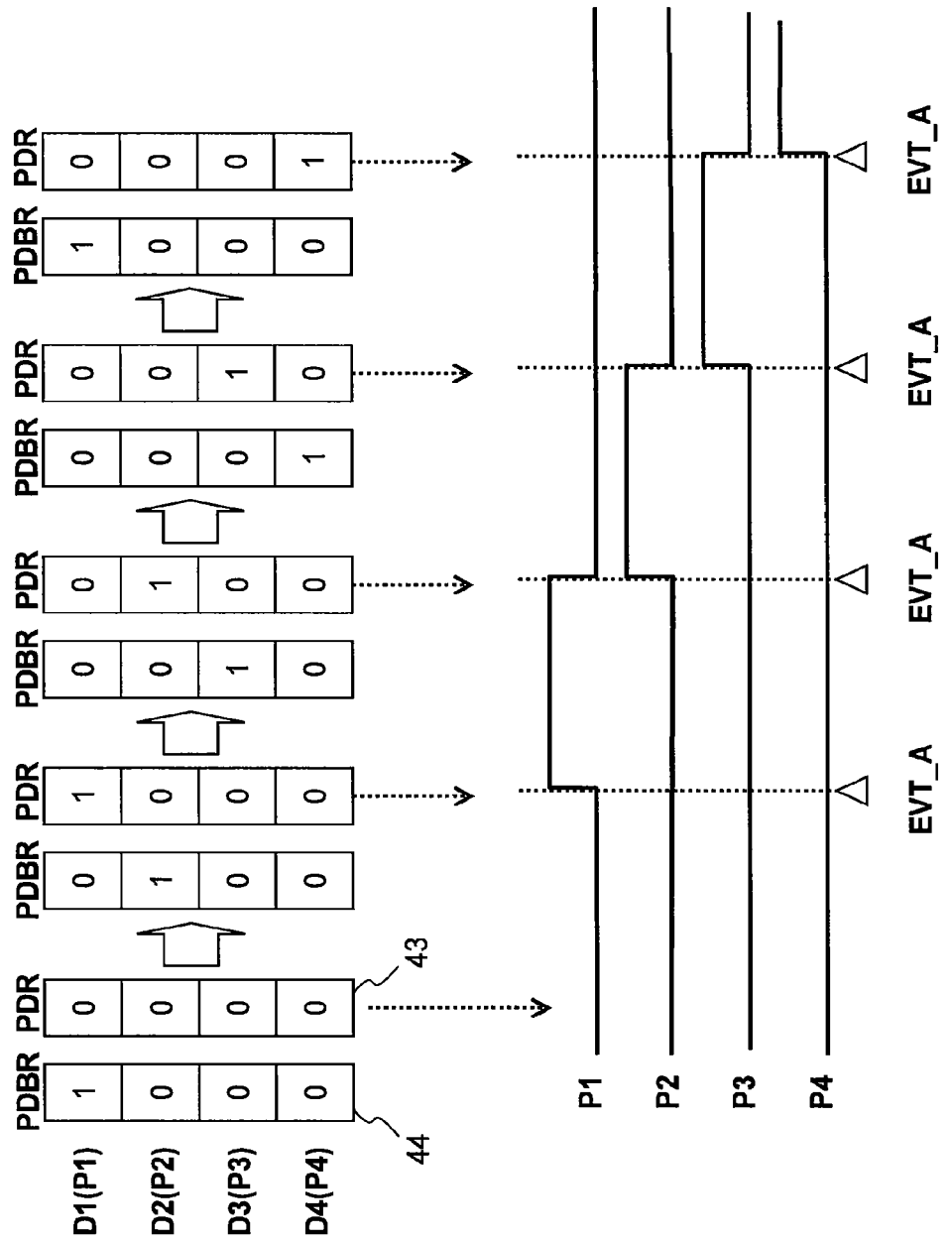

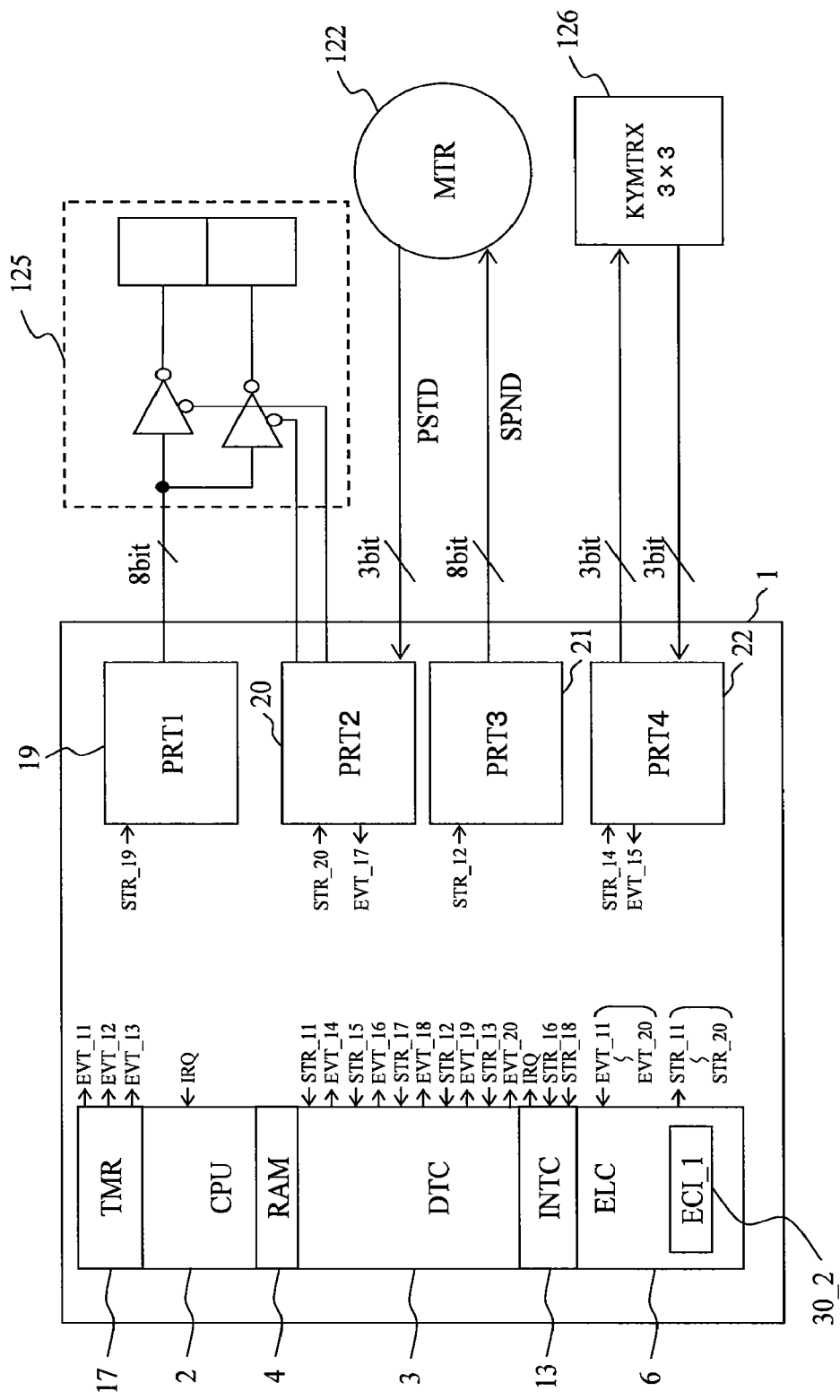

DATA PROCESSOR AND CONTROL SYSTEM

CLAIM OF PRIORITY

The Present application claims priority from Japanese application JP 2007-058574 filed on Mar. 8, 2007 and JP 2008-14397 filed on Jan. 25, 2008, the content of which is hereby incorporated by reference into this application.

FIELD OF THE INVENTION

The present invention relates to a control technique for responding to an event which takes place inside or outside a data processor, which is useful for application to e.g. a microcomputer in a single chip.

BACKGROUND OF THE INVENTION

There has been an interrupt control technique as one of control techniques for responding to an event which takes place inside or outside a data processor. In interrupt control, when various kinds of causes of interrupt arise, an interrupt controller controls their acceptance according to the priority levels and interrupt mask levels. Then, the controller identifies the accepted cause of interrupt, and requests an interruption of a central processing unit. When having received the request for interruption, the central processing unit performs a process for saving the last sates of an internal register and others into a memory, and then fetches a vector depending on the cause of interrupt, and runs an fetched interrupt-processing program. As described above, arbitration by the interrupt controller and the save process by the central processing unit are required between the occurrence of a cause of interrupt and the execution of a process to respond to the cause of interrupt, and therefore it takes time until interrupt processing is started. In addition, frequent occurrences of such interrupt process increase the load on the central processing unit.

In search for publicly known examples after the invention was made, the following patent documents were found. One of them, JP-A-7-105124, discloses that it is made possible to offer all of interrupt request sources an opportunity to execute interruption equally by adoption of a set of interrupt request arbiter circuits connected in an annular form so that the priority of interrupt can be shifted. Further, JP-A-64-55667 discloses that interrupt-processing units connected in the form of a daisy chain are arranged so that they can judge in advance whether their own interrupt requests have been authorized or not when receiving direct inputs of interrupt-authorizing signal and interrupt acceptance level signal from the central processing unit, whereby the judgment concerning whether interrupt is permitted or not can be speeded up.

SUMMARY OF THE INVENTION

A conventional interrupt control technique has been insufficient from the viewpoints of speed-up of data processing and the reduction in load on a central processing unit, and it still has a problem that the efficiency of data processing of a system remains lowered on the whole. Particularly, as for a data processor for built-in control, a sequential control operation such that a desired control operation is materialized while executing interrupt processes one after another in time sequence in the order of occurrence of events is repeated in many cases. Further, it may be desired to execute two or more control operations in parallel. As a result of considering such characteristics of a data processor, the inventor found the usefulness of prescribing a combination of essential peripheral circuits and the order of operations of the peripheral circuits according to the detail of required processing and controlling a process of responding to an event.

Therefore, it is an object of the invention to provide a technique for controlling a response to an event, which can contribute to speed-up of data processing and reduction of load on a central processing unit.

It is another object of the invention to provide a data processor which can increase the efficiency of data processing of a whole system involved in controlling response to an event in application of in-device control.

The above and other objects of the invention and its novel features will be apparent from the description hereof and the accompanying drawings.

The preferred embodiments of the invention disclosed therein will be described below in brief outline.

According to the invention, an event link controller is adopted in addition to an interrupt controller, which outputs, to a circuit module, a signal for controlling start of an operation of the circuit module in response to a generated event signal. The circuit module can generate an event signal. The event link controller generates a start control signal according to the correspondences between event signals and start control signals defined by event control information. Thus, links between event signals and start control signals can be prescribed by the event control information, and therefore operations of two or more circuit modules, which are prescribed by the links can be controlled sequentially. Such control neither involves save and return processes by a central processing unit as in the interrupt processing, nor needs an intervention of the control such as priority level control executed on competing interrupt requests.

BRIEF DESCRIPTION OF THE DRAWINGS

FIG. 3 is an illustration showing concrete examples of principal operations of the circuit modules specified by the start control signal;

FIG. 4 is an illustration showing principal concrete examples of event signals output by the circuit modules;

FIG. 5 is an illustration showing examples of the relation of links between event signals and start control signals;

FIG. 12 is an illustration of assistance in explaining an example of grouping of I/O data bits of the I/O port;

FIG. 13 is a block diagram showing the case where CPU runs a first program thereby to perform a particular process using two or more circuit modules as an concrete example of a series of links between the occurrence of events and the start of operations;

FIG. 17 is a timing chart showing an example of the bit rotation output operation by the I/O port;

FIG. 31 is a block diagram showing, in detail, an example of a control system of the laundry machine shown in FIG. 30 with the focus on the microcomputer;

DETAILED DESCRIPTION OF THE PREFERRED EMBODIMENTS

1. Summary of the Preferred Embodiments

Figure 1:
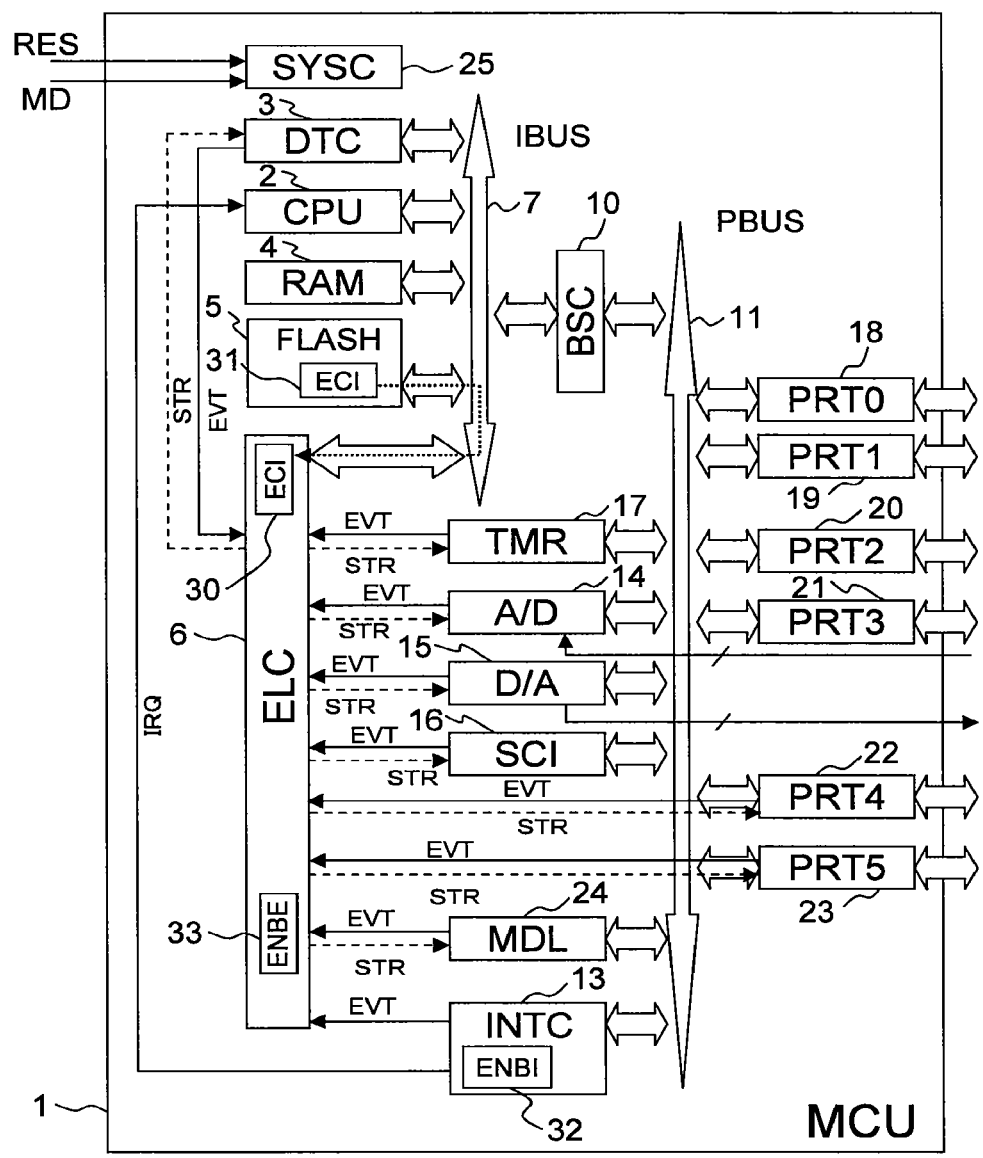
FIG. 1 is a block diagram showing an example of a microcomputer in association with one embodiment of the invention.

First, the preferred embodiments of the invention disclosed herein will be described in outline. In the description of the preferred embodiments, the reference characters or signs to refer to the drawings, which are accompanied with paired round brackets, only exemplify what the concepts of components referred to by the characters or signs contain.

[1] A data processor in association with a preferred embodiment of the invention has: a central processing unit which executes an instruction; circuit modules used by the central processing unit; an interrupt controller which makes a request for interruption to the central processing unit in response to a generated event signal; and an event link controller which outputs a start-of-operation control signal to each circuit module in response to a generated event signal. In the data processor, each circuit module can produce the event signal. The event link controller has a rewritable memory circuit. The memory circuit is used to store event control information for determining a start control signal to be output in response to the event signal. Thus, links between event signals and start control signals can be prescribed by the event control information, and therefore operations of two or more circuit modules, which are prescribed by the links can be controlled sequentially. Such control neither involves save and return processes by a central processing unit as in the interrupt processing, nor needs an intervention of the control such as priority level control executed on competing interrupt requests. Hence, the invention can contribute to speed-up of data processing and reduction of the load on the central processing unit, and thus can increase the efficiency of data processing of the system on the whole. Further specifically, the following are materialized by the invention: to parallelize processes to respectively respond to two or more events; to speed up response to occurrence of an event; and to reduce the load on CPU when responding to occurrence of an event.

In a specific form, the event control information is information which specifies correspondences between the event signals and circuit modules variably and specifies selective operations for the circuit modules variably. In the case where each circuit module has two or more operation forms, the event control information which prescribes correspondences between the event signals and start control signals can be formed hierarchically.

In another specific form, the data processor has a nonvolatile memory circuit for rewritably holding the event control information, in which the memory circuit of the event link controller is a register into which the event control information is loaded from the nonvolatile memory circuit. This facilitates initial setting of event control information e.g. at the time of power-on reset. As the event control information is rewritable, it becomes easier to adopt event control information which fits the configuration of a system to which the data processor is applied.

In another specific form, the interrupt controller and event link controller each have an event enable register for holding information for deciding whether the event signal input thereto is enabled or disabled. When the interrupt controller and event link controller use a common event signal, the contention can be avoided readily.

In another specific form, the data processor has, as one of the circuit modules, a timer operable to execute a count operation, a compare-match operation, and an input capture operation. The event link controller can outputs a start control signal for starting any one of the count operation, compare-match operation and input capture operation according to the event control information. In response to occurrence of any one of overflow or underflow owing to the count operation, compare match and input capture, the timer can produce an event signal corresponding thereto. This form is adaptable to both the interrupt controller and event link controller without adopting a special configuration for the timer.

In another specific form, the data processor has, as one of the circuit modules, an analog-to-digital converter with analog-to-digital conversion channels for converting an analog signal into a digital signal. The event link controller can output a start control signal for activating one of the analog-to-digital conversion channels according to the event control information. In response to completion of analog-to-digital conversion, the analog-to-digital converter can generate an event signal corresponding thereto. This form is adaptable to both the interrupt controller and event link controller without adopting a special configuration for the analog-to-digital converter.

In another specific form, the data processor has, as one of the circuit modules, a digital-to-analog converter with digital-to-analog conversion channels for converting a digital signal into an analog signal. The event link controller can output a start control signal for activating one of the digital-to-analog conversion channels according to the event control information. This form is adaptable to both the interrupt controller and event link controller without adopting a special configuration for the digital-to-analog converter.

<<Event Input from the Outside>>

In another specific form, the data processor has, as one of the circuit modules, a plurality of external interface ports. In response to change in input state of an external signal input to a given external terminal from the outside of the data processor, each external interface port can generate an event signal corresponding thereto. This makes it possible to input an event signal from the outside of the data processor.

<<Output of an Event to the Outside>>

In another specific form, the event link controller can output a start control signal for outputting an event signal output by each circuit module through a given external terminal to the outside of the data processor, to each external interface port according to the event control information. This makes it possible to output an event signal generated inside the data processor to the outside of the data processor.

<<Port Input by Event Synchronization>>

In another specific form, the data processor has, as one of the circuit modules, an external interface port connected to an external terminal of the data processor and operable to perform input and output operations. The external interface port has an interface register used to store input and output information. The event link controller can output a start control signal for outputting information in the interface register through an external terminal to the outside of the data processor, to an external interface port according to the event control information. This enables execution of a port input operation to an external interface port in synchronization with an event signal.

<<Port Output by Event Synchronization>>

In still another specific form, the event link controller can output a start control signal for inputting information supplied to an external terminal from the outside of the data processor to the interface register, to the external interface port according to the event control information. This makes it possible to perform a port output operation to an external interface port in synchronization with an event signal.

<<Link between Event Generation and Operation Start>>

In another specific form, on receipt of a first event signal from first one of the circuit modules, the event link controller outputs a start control signal for causing second one of the circuit modules to perform a given operation. On receipt of a second event signal from the second circuit module, the event link controller outputs a start control signal for causing third one of the circuit modules to perform a given operation. By a content of description included in the event control information, generation of an event can be linked to activation of each circuit module readily.

As one example of that, the following arrangement may be made. That is, on receipt of a first event signal from first one of the circuit modules, the event link controller may output a first start control signal for causing second one of the circuit modules to transfer data to third one of the circuit modules. Further, on receipt of a second event signal produced in response to completion of the data transfer from the second circuit module, the event link controller may output a second start control signal for causing third one of the circuit modules to output the data outside.

<<Bit Rotation Output>>

In a specific example of this form, the first circuit module is a timer, the second circuit module is a data transfer control circuit, and the third circuit module is an external interface port. In this case, the first event signal is a signal generated in response to the time-out of the timer. The second event signal is a signal generated in response to completion of data transfer. By application of the arrangement like this, parallel outputs of data can be materialized by bit rotation periodically. For instance, the event link controller repeats output of the first start control signal and output of the second start control signal in turn. In addition, the data transfer control circuit switches data targeted for transfer cyclically in turn each time output of the first start control signal is repeated. Further, the external interface port outputs parallel data changing in a toggling style outside while changing their bit position in turn each time output of the second start control signal is repeated. The bit rotation output like this is applicable to e.g. two or more scan enable signals for key scan.

In another example, the first circuit module is an external input interface circuit; the second circuit module is a data transfer control circuit; the third circuit module is an external output interface circuit; the first event signal is a signal generated in response to completion of an input operation; and the second event signal is a signal generated in response to completion of data transfer. The link between event generation and start operation like this can readily materialize a sequence of operations linked one another, such as converting the result of measurements of e.g. a temperature by use of an external input interface such as an analog-to-digital converter, and then outputting the resultant digital data through an external output interface circuit such as a communication port to a display device, control device and the like, which are located in the outside.

[2] A data processor according to another aspect of the invention has: a central processing unit which executes an instruction; circuit modules used by the central processing unit; an interrupt controller which makes a request for interruption to the central processing unit in response to a generated event signal; and an event link controller which outputs a start-of-operation control signal to each circuit module in response to a generated event signal. The event link controller generates a start control signal according to correspondence between the event signal and start control signal rewritably defined in a memory circuit.

In a specific form, the memory circuit is a register which the central processing unit can access, and whose initial setting is performed by power-on reset of the data processor.

[3] A data processor according to still another aspect of the invention has: a central processing unit which executes an instruction; and first to third internal circuits controlled by the central processing unit. The first internal circuit is an interrupt controller which responds to an event signal supplied by the second or third internal circuit and outputs an interrupt request signal to the central processing unit. The second internal circuit is an event link controller which responds to an event signal supplied by the first or third internal circuit, and outputs a start control signal to the third internal circuit. The processings to respectively respond to two or more events can be parallelized because the data processor has the event link controller. In the response to occurrence of an event, the event link controller is faster than the interrupt controller. This is because the processes of saving and returning the content of a set of registers in the central processing unit are not needed. Further, it becomes possible to reduce in load on CPU in responding to occurrence of an event.

In a specific form, the event link controller has a memory circuit for rewritably holding event control information which defines a start control signal corresponding to the event signal. It becomes possible to programmably set the procedure of processing by use of the event link controller.

In a further specific form, when an event signal is supplied to the event link controller, the event link controller refers to the event control information kept in the memory circuit, and outputs a start control signal corresponding to the event signal. The event link controller can control generation of required start control signal by a simple processing such as making reference to the memory circuit.

[4] A control system in association with a preferred embodiment of the invention has: a sensor; a data processor which performs data processing on receipt of an output of the sensor; and a controlled circuit which is controlled in operation based on an output of the data processor. The data processor has a central processing unit which executes an instruction, and a first internal circuit, a second internal circuit and third internal circuits under control of the central processing unit. The first internal circuit is an interrupt controller which responds to an event signal supplied by the second internal circuit or one of the third internal circuits and outputs an interrupt request signal to the central processing unit. The second internal circuit is an event link controller which responds to an event signal supplied by the first internal circuit or one of the third internal circuits and outputs a start control signal for another one of the third internal circuits. The third internal circuits contain a timer, an analog-to-digital converter, a RAM, a data transfer control circuit and an external interface circuit. The timer outputs first and second event signals at different intervals respectively. The analog-to-digital converter outputs a third event signal on completing analog-to-digital conversion. The data transfer control circuit outputs a fourth event signal on completing data transfer. The event link controller responds to the first event signal, and outputs a start control signal for causing the analog-to-digital converter to perform analog-to-digital conversion of a signal output by the sensor. Further, the event link controller responds to the third event signal, and outputs a start control signal for causing the data transfer control circuit to transfer a result of the conversion by the analog-to-digital converter to the RAM. Also, the event link controller responds to the fourth event signal, and outputs, to an interrupt controller, a start control signal for directing the central processing unit to produce control data by use of data of the conversion result on the RAM and to store the control data in the RAM, and in parallel outputs a start control signal for causing the data transfer control circuit to transfer the control data on the RAM to the external interface circuit, and causing the external interface circuit to output the control data thus transferred to the controlled circuit. Further, the event link controller responds to the second event signal, and outputs a start control signal for causing the data transfer control circuit to transfer the result-of-conversion data on the RAM to the external interface circuit and causing the external interface circuit to output the result-of-conversion data thus transferred, to the controlled circuit.

As both the interrupt controller and the event link controller are adopted, the following are made possible in the process including acquiring detection signals from a sensor, producing control data based on the acquired signals, and supplying the produced control data: to parallelize the processes to respond to two or more events; to speed up the response to occurrence of an event; and to reduce the load on CPU in responding to occurrence of an event. Therefore, the efficiency of data processing of the system can be increased on the whole.

In a specific form, the controlled circuit includes a display device using the first control data as display data, and a controller using the result-of-conversion data.

In a specific form, the sensor is a temperature sensor, the first control data is temperature-indication data, and the result-of-conversion data is measured temperature data.

Further, in a specific form, the temperature sensor includes a room temperature sensor of an indoor unit of an air conditioner, and a temperature sensor of a heat exchanger, the temperature-indication data are temperature-indication data of a room temperature, and the measured temperature data are supplied to a controller for producing drive data for the air conditioner outdoor unit.

[5] A control system according to another aspect of the invention has: a sensor; a data processor which performs data processing on receipt of an output of the sensor; and a controlled circuit which is controlled in operation based on an output of the data processor. The data processor has a central processing unit which executes an instruction, and a first internal circuit, a second internal circuit and third internal circuits under control of the central processing unit. The first internal circuit is an interrupt controller which responds to an event signal supplied by the second internal circuit or one of the third internal circuits and outputs an interrupt request signal to the central processing unit. The second internal circuit is an event link controller which responds to an event signal supplied by the first internal circuit or one of the third internal circuits and outputs a start control signal for another one of the third internal circuits. The third internal circuits contain a timer, a RAM, a data transfer control circuit and an external interface circuit. The timer outputs first and second event signals at different intervals respectively. The external interface circuit outputs a third event signal on completing data input from outside. The data transfer control circuit outputs a fourth event signal on completing data transfer. The event link controller responds to the third event signal, and outputs a start control signal for causing the data transfer control circuit to transfer data input from the sensor to the external interface circuit to the RAM in order to store, in the RAM, data input from the sensor to the external interface circuit. The event link controller responds to the fourth event signal, and outputs, to the interrupt controller, a start control signal for directing the central processing unit to produce first control data by use of data on RAM and to transfer the first control data to the external interface circuit, and in parallel for directing the central processing unit to produce second control data by use of a count value of the timer and store the second control data in the RAM. The event link controller responds to the first event signal, and outputs a start control signal for causing the data transfer control circuit to transfer the second control data on the RAM to the external interface circuit, and to output, to the controlled circuit, the second control data thus transferred. The event link controller responds to the second event signal, and outputs a start control signal for causing the external interface circuit to output the transferred first control data to the controlled circuit.

As both the interrupt controller and the event link controller are adopted, the following are made possible in the process including acquiring detection signals from a sensor, producing control data based on the acquired signals, and supplying the produced control data: to parallelize the processes to respond to two or more events; to speed up the response to occurrence of an event; and to reduce the load on CPU in responding to occurrence of an event. Therefore, the efficiency of data processing of the system can be increased on the whole.

In a specific form, the controlled circuit contains a display device using the first control data as display data, and a drive circuit using the second control data as drive data.

Further, in a specific form, the data is rotation angle data of a motor, the first control data is accumulated time data, and the second control data is motor drive data.

[6] A control system according to another aspect of the invention has: a key input device; a data processor which receives an output of the key input device to perform data processing; and a controlled circuit whose operation mode is controlled based on an output of the data processor. The data processor has a central processing unit which executes an instruction, and a first internal circuit, a second internal circuit and third internal circuits under control of the central processing unit. The first internal circuit is an interrupt controller which responds to an event signal supplied by the second internal circuit or one of the third internal circuits and outputs an interrupt request signal to the central processing unit. The second internal circuit is an event link controller which responds to an event signal supplied by the first internal circuit or one of the third internal circuits and outputs a start control signal for another one of the third internal circuits. The third internal circuits contain a timer, a RAM, a data transfer control circuit and an external interface circuit. The timer outputs a first event signal at given intervals. The external interface circuit outputs a second event signal on completing data input from outside. The data transfer control circuit outputs a third event signal on completing data transfer. The event link controller responds to the first event signal, and outputs a start control signal for causing the data transfer control circuit to transfer key scan data to the external interface circuit and causing the external interface circuit to output the transferred key scan data to the key input device. The event link controller responds to the second event signal, and outputs a start control signal for causing the data transfer control circuit to transfer the key input data of the external interface circuit to the RAM. The event link controller responds to the third event signal, and outputs, to the interrupt controller, a start control signal for causing the central processing unit to judge input data by use of the key input data of the RAM, and causing the external interface circuit to output a result of the judgment to the controlled circuit. Thus, adoption of the interrupt controller and event link controller can increase the efficiency of data processing in key input control.

2. Further Detailed Description of the Preferred Embodiments

Now, the preferred embodiments will be explained further. The best forms for carrying out the invention is described below in detail with reference to the drawings. It is noted that in all the drawings for explaining the best mode carrying out the invention, the members having identical functions are identified by the same reference numeral, and the repeated description thereof is omitted.

Referring to FIG. 1, an example of a microcomputer according to an embodiment of the invention is shown. The microcomputer (MCU) 1 has: a central processing unit (CPU) 2 which executes an instruction; a data transfer controller (DTC, which is also referred to as "data transfer control circuit) 3; a RAM 4; a flash memory (FLASH) 5; and an event link controller (ELC) 6. These circuits are commonly connected to an internal bus (IBUS) 7; the internal bus 7 is connected through a bus state controller (BSC) 10 to a peripheral bus (PBUS) 11. However, the invention is not so limited particularly. To the peripheral bus 11 are connected: an interrupt controller (INTO) 13; an analog-to-digital converter (A/D) 14 for converting an analog signal into a digital signal; a digital-to-analog converter (D/A) 15 for converting a digital signal into an analog signal; a serial communication interface circuit (SCI) 16; a timer (TMR) 17; I/O ports (PRT0 to PRT5) 18 to 23; and other circuit (MDL) 24. The analog input of the analog-to-digital converter A/D 14 and the analog output of the digital-to-analog converter D/A 15 can be interfaced outside the microcomputer 1 through the I/O ports 18 to 23. On receipt of a reset signal RES or a mode signal MD as an input, the system controller (SYSC) 25 decides the operation mode of the microcomputer. RAM 4 holds a work area of CPU 2, and FLASH 5 holds a program and data of CPU 2 rewritably.

The data transfer controller 3, analog-to-digital converter 14, digital-to-analog converter 15, serial communication interface circuit 16, timer 17, I/O ports 22 and 23, and other circuit 24 output an event signal EVT according to the working or internal state, etc. However, the invention is not so limited particularly. The event signal EVT is supplied to the interrupt controller 13. In the drawing, the route for the supply is not shown graphically. The interrupt controller 13 judges the input event signal EVT in interrupt priority level and interrupt mask level, and issues an interrupt request signal IRQ to allow the central processing unit 2 to execute interrupt processing for responding to the event. On the other hand, the event signal EVT is supplied to the event link controller 6. The event link controller 6 holds in a register 30 event control information ECI which defines the correspondence between the event signals EVT and start control signals STR. When receiving a supply of the event signal EVT, the event link controller 6 outputs the start control signal STR corresponding to the event signal EVT according to the event control information ECI. The source of the event signal EVT and the destination of the start control signal STR may be the same circuit module, or different circuit modules, and their correspondences are defined by the event control information ECI. The interrupt controller 13 can output the event signal EVT to the event link controller 6 depending on its working state. However, the invention is not so limited particularly. Now, it is noted that circuits which output the event signal EVT and receive an input of the start control signal STR are also generically referred to as "circuit modules" for the sake of convenience.

The flash memory 5 has a memory region 31 for rewritably holding the event control information ECI. The event control information ECI is loaded into the register 30 of the event link controller 6 from the memory region 31. For instance, the CPU 2 transfers the event control information ECI from the memory region 31 to the register 30 to make the initial setting according to a reset exception handling at the time of power-on reset. After that, the CPU 2 may rewrite the event control information ECI. Because the memory region 31 is rewritable, required event control information ECI can be easily set according to the configuration of a system to which the microcomputer 1 is applied.

The interrupt controller 13 has an event enable register 32 for holding information ENBI to decide whether an input event signal is enabled or disabled. The event link controller 6 has an event enable register 33 for holding information ENBE to decide whether an input event signal is enabled or disabled. The registers 32 and 33 are both initialized by a reset process, and after that the registers can be changed in setting by the CPU 2 in a privileged mode or the like. However, the invention is not so limited particularly. Thus, by one event signal EVT, interrupt control by the interrupt controller 13 and start control of a circuit module by the event link controller 6 may be caused in an alternative way, or otherwise the control by which both the interrupt control and start control are caused in parallel may be performed. As a matter of course, it is needless to say that the contention between the interrupt control by the interrupt controller 13 and the start control of each circuit module by the event link controller 6 can be avoided by a common event signal.

Figure 2:
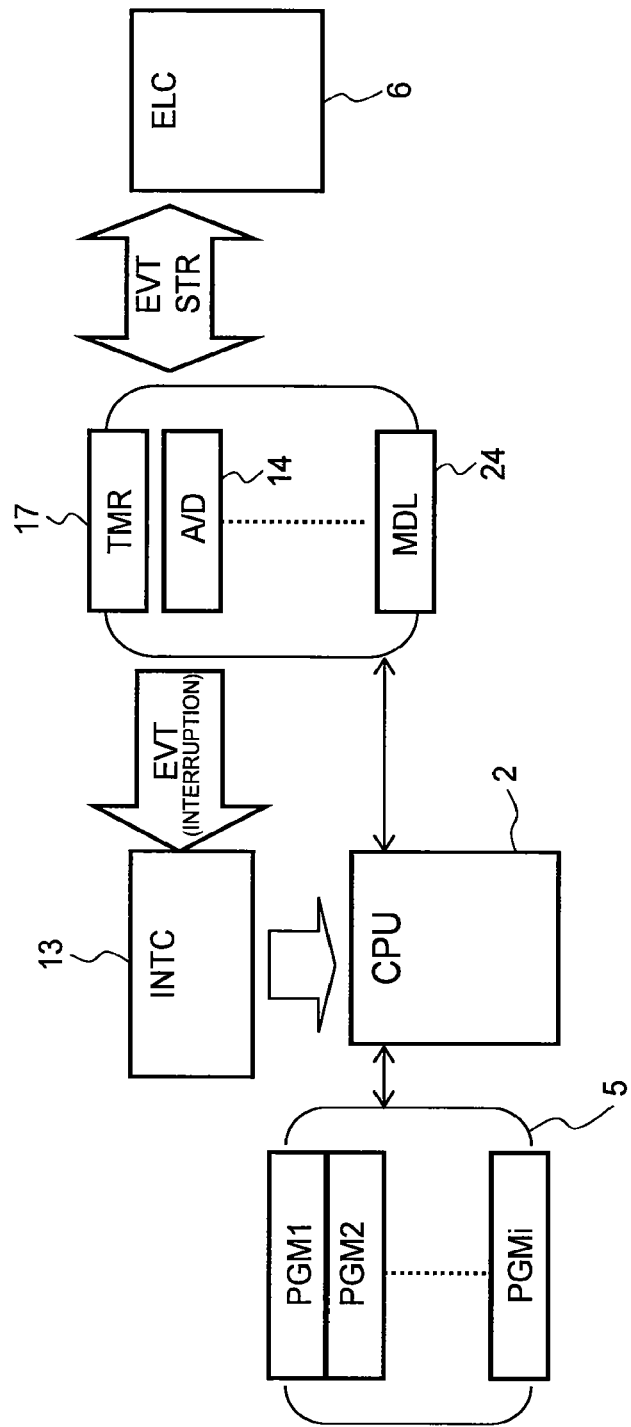
FIG. 2 is a block diagram showing interrupt control by the interrupt controller and start control of circuit modules by the event link controller conceptually.

Referring to FIG. 2, the interrupt control by the interrupt controller 13 and start control of circuit modules by the event link controller 6 are shown conceptually. The interrupt controller 13 makes a request for interruption to the CPU 2 on receipt of an event signal EVT produced by each circuit module (14, . . . , 24), and makes the CPU run an interrupt-processing program corresponding to it, thereby materializing a process to respond to the event signal EVT by use of the circuit module. The CPU 2, which runs the interrupt-processing program PGMi, sets a start enable register of the circuit module to be operated thereby to start the circuit module. On the other hand, when each circuit module produces the event signal EVT, the event link controller 6 uses a start control signal STR to directly start an operation of the circuit module to respond to the event signal EVT, whereby a process to respond to the event signal EVT is materialized. The circuit module, which receives the start control signal STR, is actuated when e.g. its start enable register is set by the start control signal STR. As a process that the event link controller 6 carries out is used to start a process to respond to occurrence of an event, the speed-up of response to occurrence of an event, and the reduction in load on CPU when responding to occurrence of an event can be achieved. Further, it becomes easier to make parallel processes to respond to two or more events respectively. When the load on CPU in responding to an event is reduced, the CPU can allocate the surplus power thus gained to the other data processing, and thus it becomes possible to increase the efficiency of data processing of the whole system.

Referring to FIG. 3, concrete examples of principal operations of circuit modules specified by the start control signal are shown. FIG. 4 shows principal concrete examples of event signals that the circuit modules output.

The timer 17 can execute e.g. a count operation, a compare-match operation and an input capture operation. When receiving input of a corresponding start control signal, the timer starts the count operation, compare-match operation, input capture operation, or the like. Initial conditions required for the respective operations are set in a timer control register in the timer by CPU 2 at the time of initial setting. For instance, the initial settings of the following values and timing are made: a count-up value when the up-count operation is performed; a counter-preset value when the down-count operation is performed; a comparison value when the compare-match operation is performed; and the timing to carry out a capture operation on a pulse input, e.g. timing in synchronization with the rising edge of the pulse, timing in synchronization with the falling edge of the pulse, or timing in synchronization with both the rising and falling edges, when the input capture operation is performed. The timer can output corresponding event signals according to the occurrences of overflow, underflow, compare match, and input capture.

The analog-to-digital converter 14 begins analog-to-digital conversion on receipt of input of a start control signal which directs start of the conversion, and it can output an event signal at the time of completion of the analog-to-digital conversion. The digital-to-analog converter 15 begins digital-to-analog conversion on receipt of input of a start control signal which directs start of the conversion.

The serial communication interface circuit (SCI) 16 begins a data-sending operation to or data-receiving operation from the outside on receipt of input of a start control signal which directs start of the operation, and selectively outputs event signals corresponding to completion of the sending, completion of the receiving, sending data empty, receive data full, transfer error, etc.

In the case where the I/O ports (PRT_OUT) 22 and 23 have been set in their operations so that they serve as output ports, the ports 22 and 23 each perform a data output operation to output a set value to an external terminal, or an event output operation to output an internal event to the external terminal, on receipt of a start control signal for starting an operation to output a signal to an external terminal. In the case where the I/O ports (PRT_IN) 22 and 23 have been set so that they serve as input ports, the ports 22 and 23 each perform an event input operation to input a change at the external terminal as an event, or a data input operation to take a change at the external terminal in its register. When the operations of the I/O ports 22 and 23 have been set so that the ports serve as input ports, the ports each produce an event signal in response to an external event input operation.

The data transfer control circuit (DTC) 3 reads transfer control data having a pointer structure from the RAM and starts transfer of the data in response to a transfer start control signal. Then, when completing the data transfer, the DTC 3 outputs an event signal of completion of transfer. The transfer control data have been previously stored in a predetermined region of the RAM depending on each data transfer channel by the CPU 2. The head address of the region for storing the transfer control data for each transfer channel has been set in a DTC control register inside the DTC by the CPU 2 at the time of initial setting.

The interrupt controller 13 can output an event signal EVT in response of occurrence of an interrupt request to the CPU 2.

Referring to FIG. 5, examples of the relation of links between event signals and start control signals are shown. The circuit modules, which output an event signal EVT, are listed in a direction of a column of the table shown in the drawing, and the circuit modules, to which a start control signal (start event) STR is input, are listed in a direction of a row of the table. Also, in FIG. 5, as examples of the other circuit (MDL) 24 are shown a watchdog timer (WDT), and a timer serving as a timepiece (RTC). For instance, when a conversion operation by the analog-to-digital converter 14 is started in response to an input operation of the input port (PRT_IN), a predetermined event signal EVT produced by the input port (PRT_IN)

is linked to a start control signal STR for starting the conversion operation by the analog-to-digital converter (L1). To cause the output port (PRT_OUT) to start an output operation in response to completion of the conversion operation by the analog-to-digital converter 14, an event signal output at the time of completion of the conversion operation by the analog-to-digital converter 14 is linked to a start control signal STR for directing the output port (PRT_OUT) to execute an output operation (L2). The link between a required event signal EVT and a start control signal STR, which is also referred to as "event link" simply, may be defined by the event control information ECI. As is clear from FIG. 5, the form of link which can be defined by the event control information ECI is free. When the detail of data processing by the microcomputer 1 is changed, it is possible to cope with the change by switching the event control information ECI. Therefore, even when a circuit module included in the microcomputer is changed, the event link according to any combination of the event signal and start control signal can be controlled by changing information about the link according to the event control information ECI.

Figure 6:
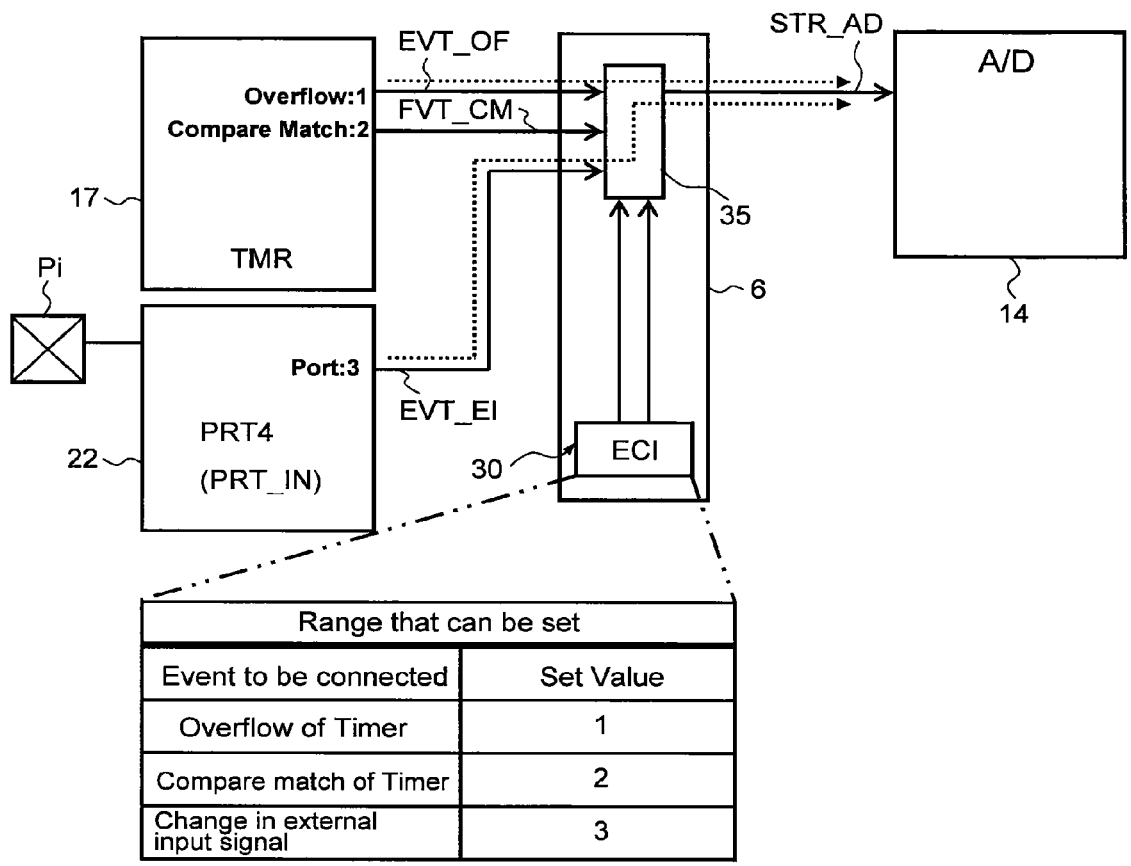
FIG. 6 is an illustration showing an example of the method of controlling the event link according to event control information.

Referring to FIG. 6, an example of the method of controlling the event link according to the event control information is shown. Here is cited the example where the timer 17 and the I/O port 22 set to serve as an input port (PRT_IN) are event-linked to the analog-to-digital converter 14. The value "1" of the event control information ECI links an overflow event signal EVT_OF of the timer 17 to a conversion start control signal STR_AD for the analog-to-digital converter. The value "2" of the event control information ECI links a compare-match event signal EVT_CM of the timer 17 to the conversion start control signal STR_AD for the analog-to-digital converter. The value "3" of the event control information ECI links an external input event signal EVT_EI depending on the change in input at an external terminal Pi to the conversion start control signal STR_AD for the analog-to-digital converter. The analog-to-digital converter performs conversion from an analog signal into a digital signal on receipt of the conversion start control signal STR_AD. Depending on which of the values 1, 2 and 3 the register 30 holds as the event control information ECI, the event link decided by the value is materialized by a selector 35. When the register holds the values 1 and 3, i.e. ECI=1, 3, the conversion start control signal STR_AD for the analog-to-digital converter is output in both the cases of generation of the overflow event signal EVT_OF and generation of the external input event signal EVT_EI. The arrangement of the selector, register, etc. as described above makes it possible to event-link one appropriate circuit module in response to output of event signals by two or more circuit modules. Even when two or more circuit modules are operated in parallel, it becomes possible to activate one appropriate circuit module in response to generations of event signals by the respective circuit modules.

Figure 7:
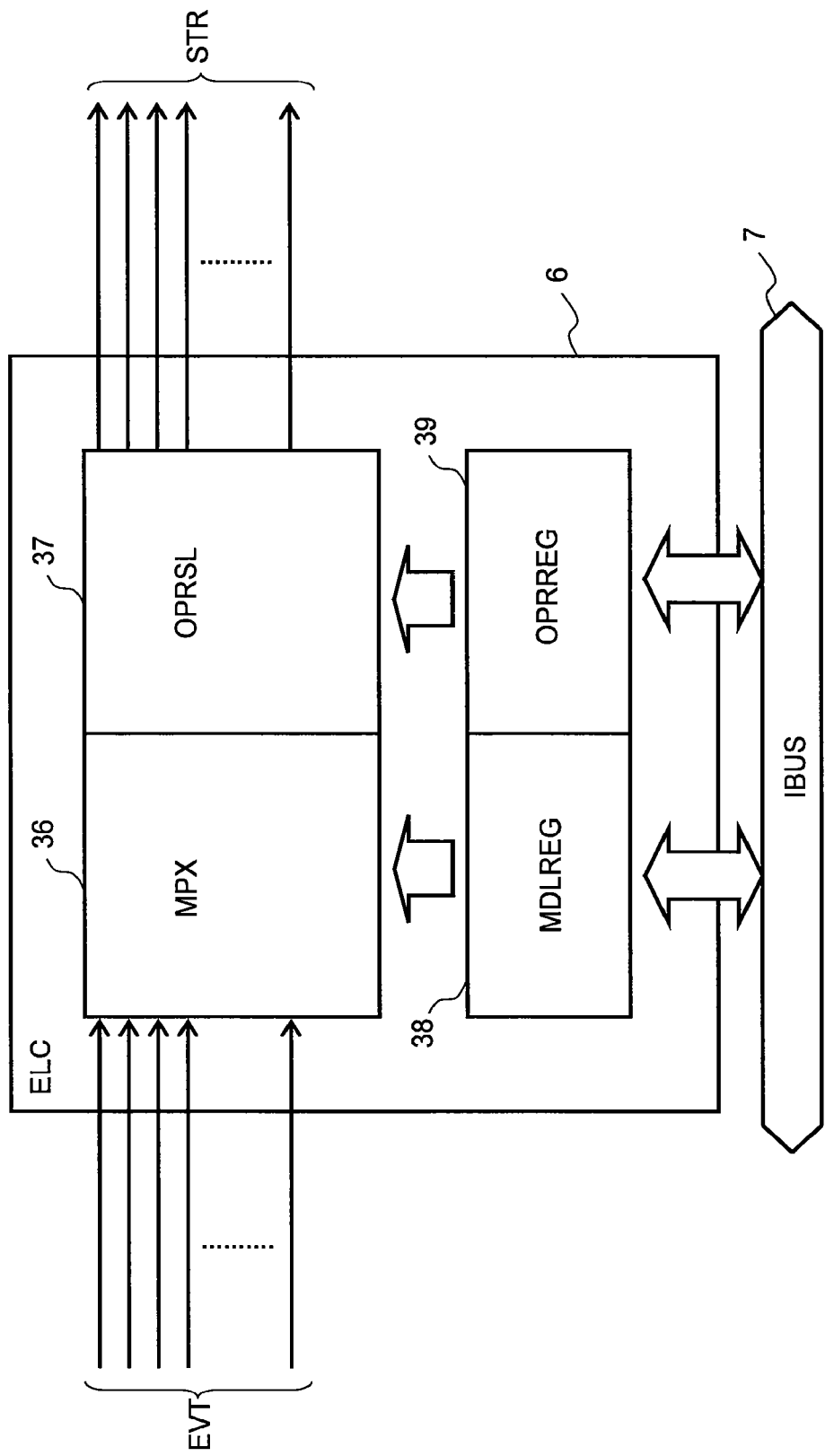
FIG. 7 is a block diagram showing another example of the structure of the event link controller.

Referring to FIG. 7, another example of the structure of the event link controller 6. The event link controller 6 has a multiplexer, which is hereinafter also referred to as "module select circuit" or "connection select circuit" (MPX) 36, and an operation select circuit (OPRSL) 37. The connection select circuit 36 accepts an input of an event signal EVT, and then decides which circuit module to be linked with the event signal. The operation select circuit 37 is a circuit which decides on which cause of start the event signal should be linked to when the circuit module, with which a decision to establish a connection has been made, has two or more causes of start. The operation select circuit 37 outputs one or more start control signals STR. The module select circuit 36 uses a value stored in a connection set register (MDLREG) 38 in its select operation. The operation select circuit 37 uses a value stored in an operation set register (OPRREG) 39 in its select operation. The settings of the registers 38 and 39 have been made by the CPU 2 previously.

Figure 8:
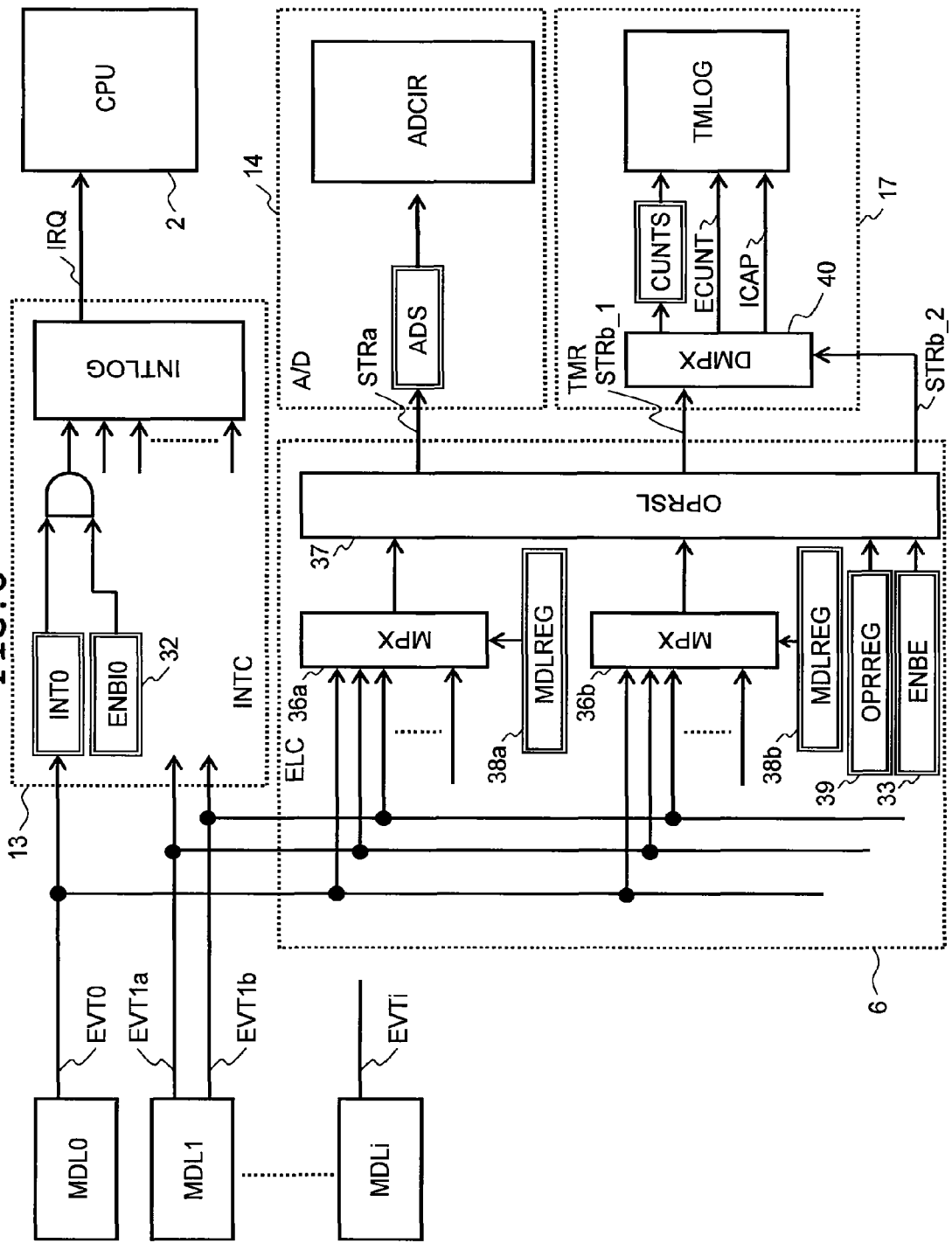
FIG. 8 is a block diagram showing the structure of a portion of the event link controller connected to the analog-to-digital converter and timer as a more concrete example of the structure of the controller.

Referring to FIG. 8, the structure of a portion of the event link controller 6 connected to the analog-to-digital converter 14 and timer 17 is shown as a more concrete example of the structure of the controller.

MDL0 to MDLi each denote a circuit module. EVT0 to EVTi each denote an event signal. In the interrupt controller 13, an interrupt flag INT0 and an interrupt enable flag ENBI0 depending on a cause of interrupt EVT0 are shown as examples. The interrupt enable flag ENBI0 occupies one bit of the event enable register 32. As to other causes of interrupt, the flags are arranged similarly. INTLOG denotes a logic circuit which performs accept-of-interrupt control to respond to an event according to the interrupt priority level and interrupt mask level thereof.

The event link controller 6 has multiplexers (MPX) 36a and 36b as an example of the forementioned connection select circuit 36. The multiplexers 36a and 36b receive inputs of event signals EVT0 to EVTi, and selects, out of the input event signals, one event signal based on the values of the connection set registers (MDLREG) 38a and 38b. The operation select circuit 37, which receives the selected signal, produces a start control signal STRa for the analog-to-digital conversion circuit 14 based on a value of the value of the operation set register 39, and generates start control signals STRb_1 and STRb_2 for the timer 17. The start control signal STRa for the analog-to-digital conversion circuit 14 sets an analog-to-digital conversion start flag ADS of the start enable register. Thus, an operation of analog-to-digital conversion is started. The start control signals STRb_1 and STRb_2 for the timer 17 are supplied to a demultiplexer (DMPX) 40. In the demultiplexer 40, according to the value of the start control signal STRb_2 for the timer 17, the signal STRb_1 serves to direct start of one of the operations of count start, event count and input capture. When the direction to start the count start is selected, the count start flag CUNTS of a start enable register of the timer is set. When the direction to start the event count is selected, an event count start signal ECUNT is generated. When the direction to start the input capture is selected, an input capture start signal ICAP is generated. TMLOG denotes a timer logic circuit which performs a timer operation including a counter operation, compare match and input capture. The event enable register 33 holds information ENBE for selectively disabling the outputs of the multiplexers 36a and 36b depending on its value.

Figure 9:
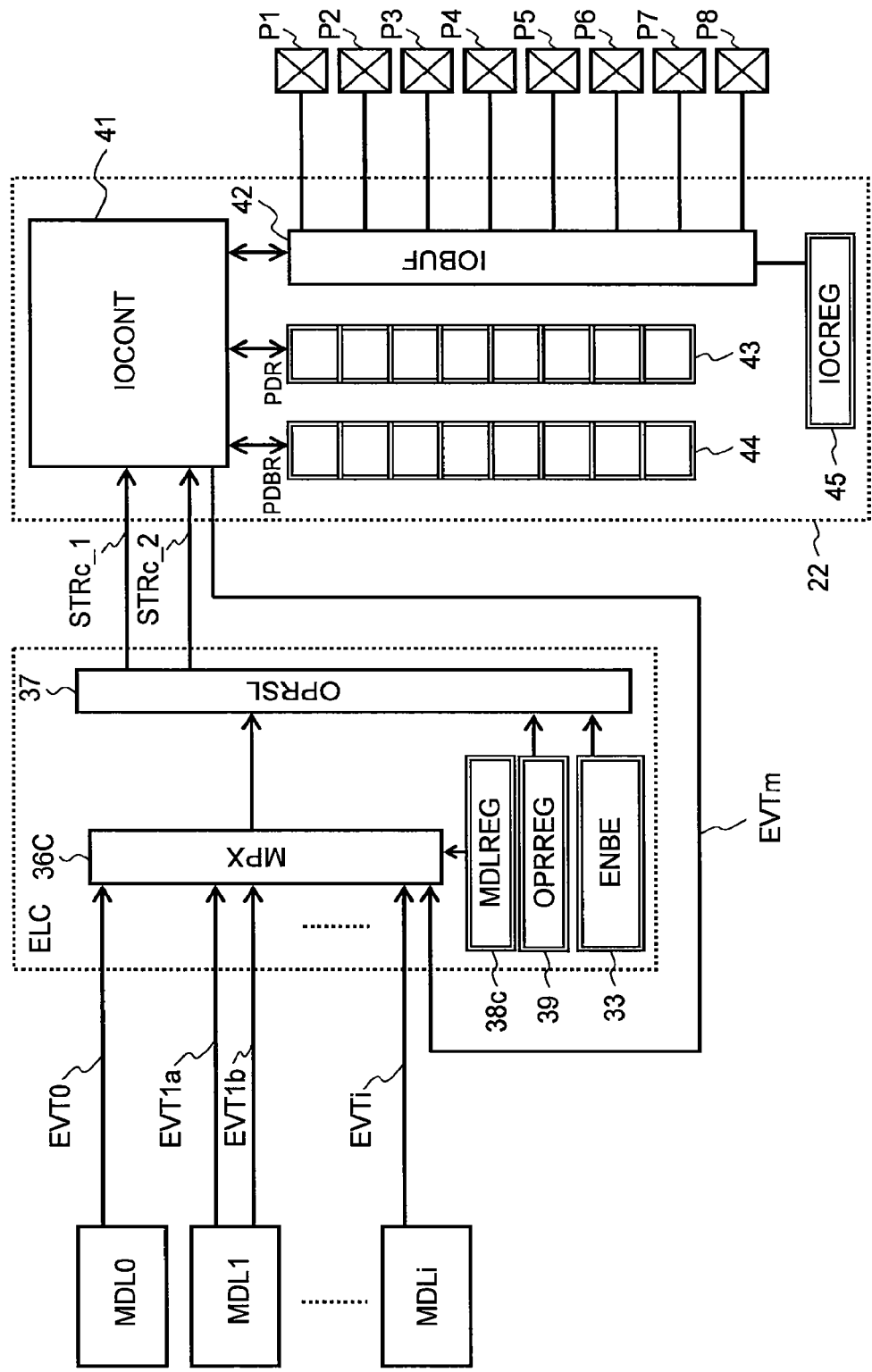
FIG. 9 is a block diagram showing the structure of a portion of the event link controller connected to the I/O port as an a still more concrete example of the structure of the controller.

Referring to FIG. 9, the structure of a portion of the event link controller 6 connected to the I/O port 22 is shown as a more concrete example of the structure of the controller.

The event link controller 6 has a multiplexer 36c as one example of the connection select circuit 36. The multiplexer 36c receives inputs of event signals EVT0 to EVTi, and selects one out of the input event signals according to the value of the connection set register 38c. The operation select circuit 37, which receives the selected signal, produces start control signals STRc_1 and STRc_2 for the I/O port 22 based on the value of the operation set register 39. The I/O control circuit (IOCONT) 41 controls input and output operations of the I/O port 22 based on values of the start control signals STRc_1 and STRc_2. To the I/O control circuit (IOCONT) 41 are connected an I/O buffer circuit, a port data register (PDR) 43, and a port data buffer register (PDBR) 44. External terminals P1 to P8 are coupled to the I/O buffer circuit 42. Whether the I/O port 22 is dedicated to an input operation, an output operation, or used for both the input and output operations, or disabled is decided by a set value of the I/O control register (IOCREG) 45. The initial setting of the register of interest is performed by the CPU 2.

Figure 10:
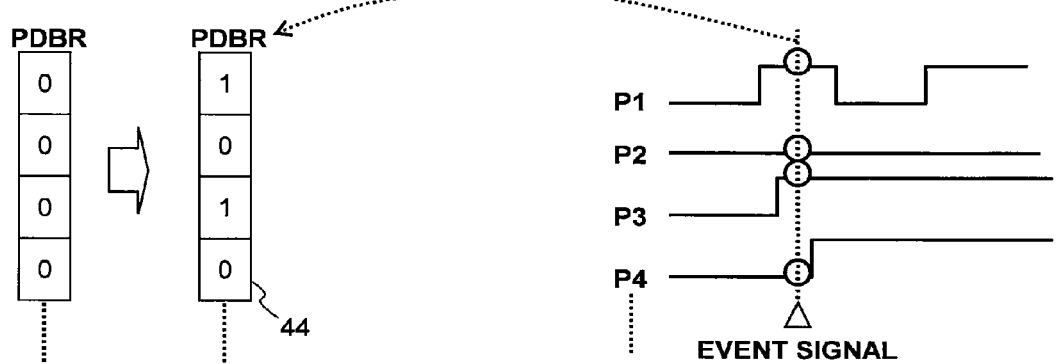
FIG. 10 is an illustration for explanation of an operation, showing, as an example, a data input operation by the I/O port when start of the data input operation is directed.
Figure 11:
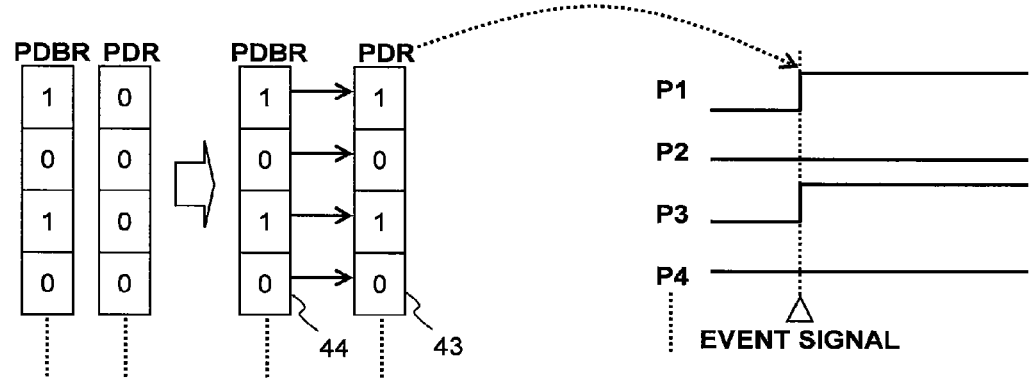
FIG. 11 is an illustration for explanation of an operation, showing, as an example, a data output operation by the I/O port when start of the data output operation is directed.

In the I/O control circuit 41, the start control signals STRc_1 and STRc_2 for the I/O port 22 are supplied to a demultiplexer (not shown). In the demultiplexer, according to the value of the start control signal STRc_2, the signal STRc_1 serves to direct start of one of the operations of data input, data output, external event input and event output to the outside. When start of the data input operation is directed, the data which is available via the external terminals P1 to P8 at the time of generation of the corresponding event signal are taken in the port data buffer register 44 as shown in the example of FIG. 10. When start of the data output operation is directed, data which has been stored in the port data buffer register 44 previously are transferred to the port data register 43 inside the port 22 and then output through the external terminals P1 to P8 as shown in the example of FIG. 11. The output timing is synchronized with the generation of the corresponding event signal. When start of the event input operation is directed, the port 22 receives an input of a signal via the external terminal corresponding to a bit specified by the control register 45. Then, when the input state of the event input agrees with a predetermined state, the port 22 outputs the event signal EVTm to the module select circuit 36 typified by the multiplexer 36c. Thus, an external event can be input. When start of the operation of event output to the outside is directed, the port outputs the data toward the external terminal from a given bit in synchronization with this. The form of data input and output operations is not limited as described above. The arrangement may be made, which includes: grouping bits B1 to B8 of the I/O buffer 42, which correspond to their terminals P1 to P8, into e.g. the groups GR1, GR2, etc. according to the settings of the control register 45, as shown in the example of FIG. 12; and outputting fixed data of the logical value "1" or "0" or particular pattern data in groups in response to occurrence of an event. Otherwise, the data may be output in a toggling style. It is needless to say that it is possible to output a fixed signal of the given logical value "1" or "0" from a particular single bit in response to occurrence of an event. Also, it is possible to make the port 22 perform external input and output operations in response to different event signals in groups such as the groups GR3 and GR4.

In the description presented with reference to FIG. 8, the multiplexers 36a and 36b have been taken as examples of the circuit module select circuit 36, whereas the multiplexer 36c has been taken as an example in the description presented with reference to FIG. 9. However, the invention is not so limited. For instance, the result of a logical product of two or more input events may be used as a requirement for producing a start control signal. Also, the order of occurrence of events can be added as one of requirements for producing a start control signal by use of a flip-flop or the like.

Referring to FIG. 13, a concrete example of a series of links between the occurrence of events and the start of operations are shown. Here is explained the case where the CPU 2 runs a first program thereby to perform a particular process using circuit modules MDL1 to MDL3. When beginning the execution of the first program, the CPU 2 makes required initial settings on the circuit modules MDL1 to MDL3 first, and directs the circuit module MDL1 to start operating. At the time of completion of a given operation, the circuit module MDL1 generates an event signal EVT_A. On receipt of this event signal, the event link controller 6 sends a start control signal STR_A to the circuit module MDL2 according to the event control information ECI, and causes the circuit module MDL2 to start operating. At the time of completion of a given operation, the circuit module MDL2 generates an event signal EVT_B. On receipt of this event signal, the event link controller 6 sends a start control signal STR_B to the circuit module MDL3 according to the event control information ECI, and causes the circuit module MDL3 to start operating. At the time of completion of a given operation, the circuit module MDL3 generates an event signal EVT_C. On receipt of this event signal, the interrupt controller 13 outputs an interrupt signal IRQ to the CPU 2. The processing by the CPU 2 branches to a second program using the result of the operation by the circuit module MDL3.

Figure 14:
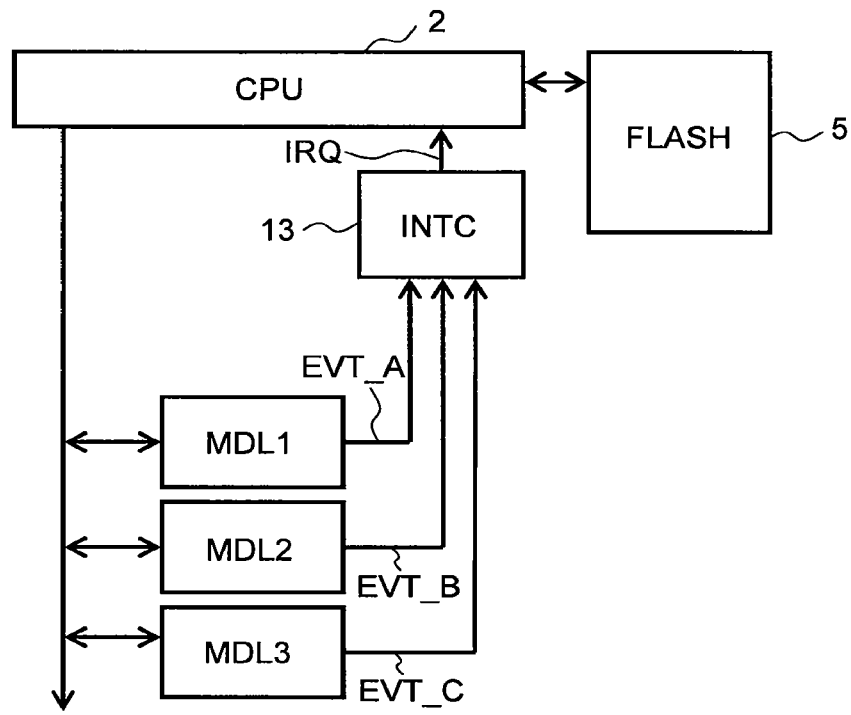
FIG. 14 is a block diagram showing the case of coping with individual event signals by means of interrupt processing as a comparative example.
Figure 15:
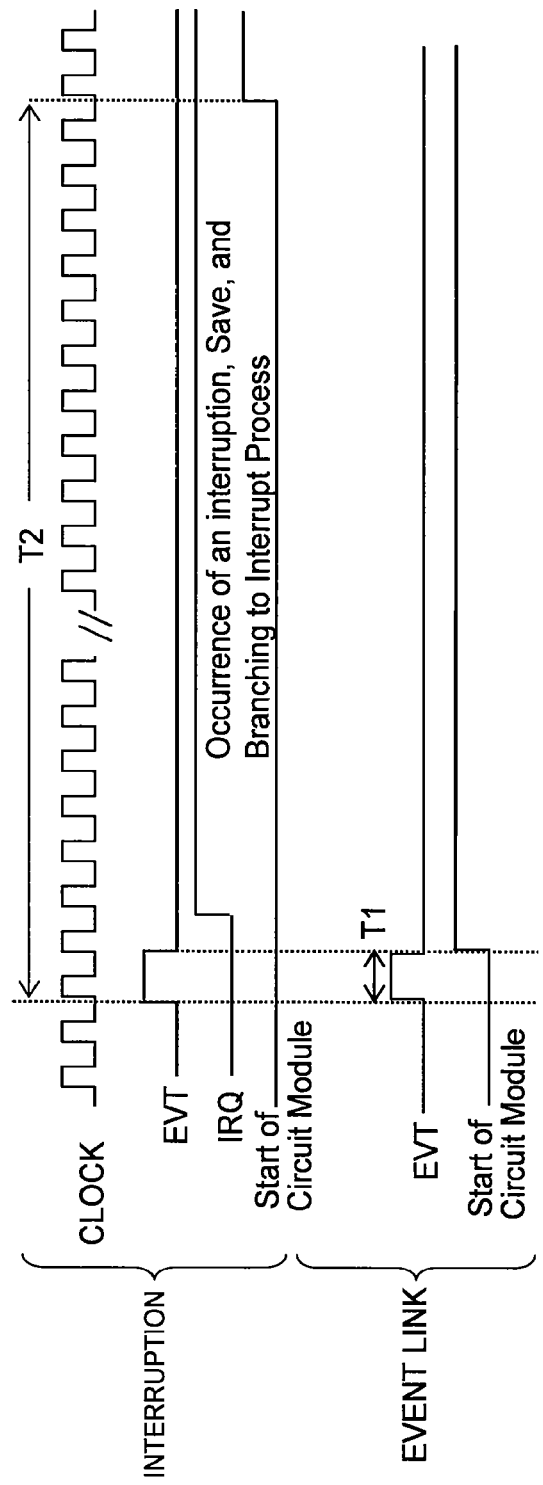
FIG. 15 is a timing chart for comparison in processing time between the processing in response to each interruption and processing according to an event link technique.

As links between event signals and start control signals can be defined by the event control information ECI in this way, the operations of the circuit modules MDL1 to MDL3, which are restricted by the links, can be controlled sequentially. Such control neither involves save and return processes by the CPU 2 as in the interrupt processing, nor needs an intervention of the control such as priority level control executed on competing interrupt requests. As shown in a comparative example of FIG. 14, in order to cope with individual event signals EVT_A to EVT_C by means of interrupt processing, the save and return processes by the CPU 2 are required. Further, the control like priority level control must be performed on competing interrupt requests until the interrupt controller 13 accepts one of the interrupt requests. Therefore, as can be seen from FIG. 15, it takes a much longer time (T2) before the transition to interrupt processing in comparison to the time (T1) required in the case of using the means of event link (T1<<T2). Hence, use of the event link method as shown in FIG. 13 enables speed-up of data processing and reduction in load on the CPU 2, and thus the efficiency of data processing by the microcomputer 1 can be increased on the whole.

Figure 16:
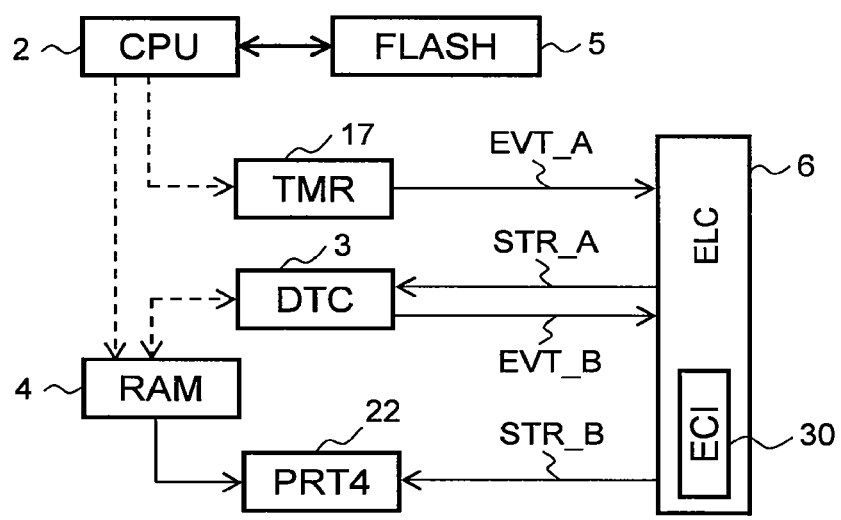
FIG. 16 is a block diagram of assistance in explaining the operation of bit rotation output by the I/O port.

Referring to FIG. 16, an example of bit rotation output by the I/O port is shown. Under the control of the CPU 2, the initial setting of the timer 17 is made so that the timer operation is repeated until the timer 17 is directed to stop the timer operation. In addition, output pattern data for bit rotation output and a transfer control condition for the data are initially set on the RAM. When the CPU 2 directs the timer 17 to start the timer operation, the timer outputs an event signal EVT_A at every time-out. In response to the event signal EVT_A, the event link controller 6 supplies a start control signal STR_A to the data transfer control circuit (DTC) 3 to direct the start of data transfer. The data transfer control circuit (DTC) 3 transfers initial data from the RAM 4 to the I/O port 22 according to a data transfer control condition of the RAM 4. On completion of the transfer, the data transfer control circuit generates an event signal EVT_B. In response to the event signal EVT_B, the event link controller 6 supplies a start control signal STR_B to the I/O port 22 (PRT4) to make the I/O port output the data in parallel. The operation as stated above is repeated each time the timer 17 counts up, and thus parallel data are output from the port 22 (PRT4) in every timer cycle. Each time the operation is repeated, the data transferred from the RAM 4 to the port 22 (PRT4) by the data transfer control circuit (DTC) 3 are switched cyclically in turn. For instance, as in the example shown by the timing chart of FIG. 17, assuming parallel output data D1 to D4 of four bits, in every timer cycle, during which the event signal EVT_A is generated, the bit position of the logical value "1" is moved to a lower position by one bit, and after having reached the position of the least significant bit, the position of "1" is returned to the position of the most significant bit, and then circulated again in the same way. The data transferred from the RAM 4 is stored in the port data buffer register (PDBR) 44. In response to generation of an event signal EVT_A, the data of the port data buffer register (PDBR) 44 is transferred to the port data register (PDR) 43 inside the port 22, and then output through the external terminals P1 to P4. Thus, bit rotation output waveforms as shown in the example of FIG. 17 can be obtained. The bit rotation output is applicable to e.g. scan enable signals for key scan. The data transfer control circuit (DTC) 3 is not limited to a structure which can transfer data according to the data transfer control condition of the RAM 4. The data transfer control circuit (DTC) 3 may be arranged so as to have a plurality of registers for storing a data transfer condition, and be able to transfer data according to the conditions set on the plurality of registers.

Figure 18:
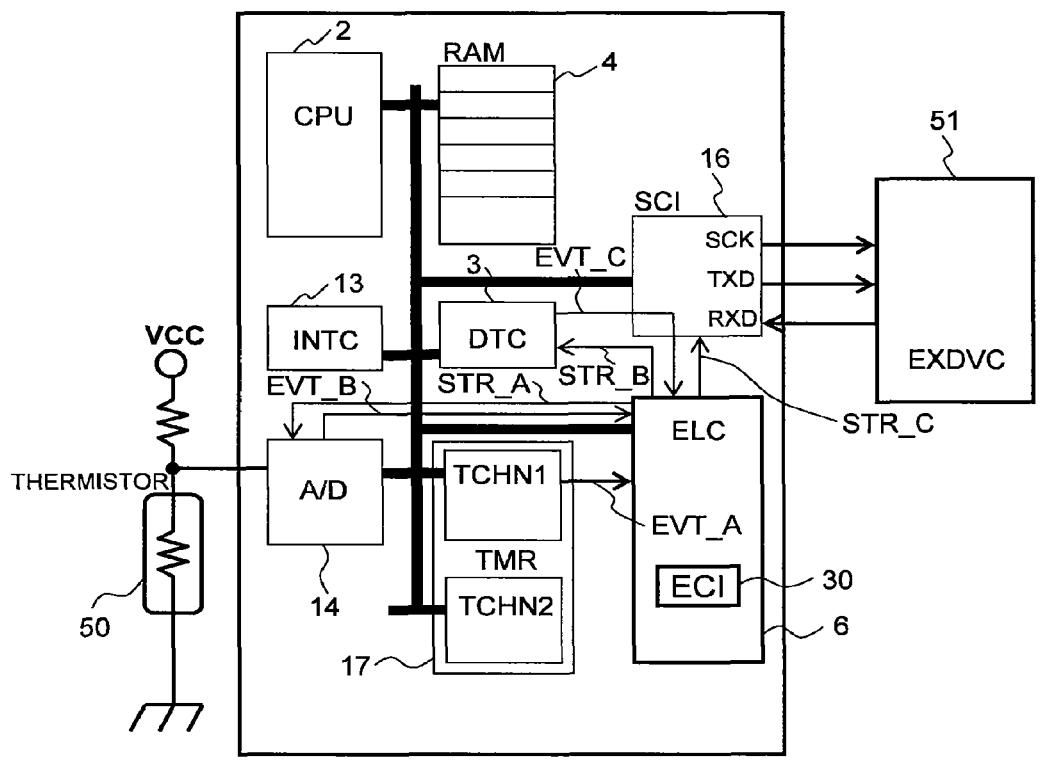
FIG. 18 is a block diagram showing an example of application to an operation including measuring a temperature at fixed intervals and communicating the result of the measurement to the outside through a bus.
Figure 19:
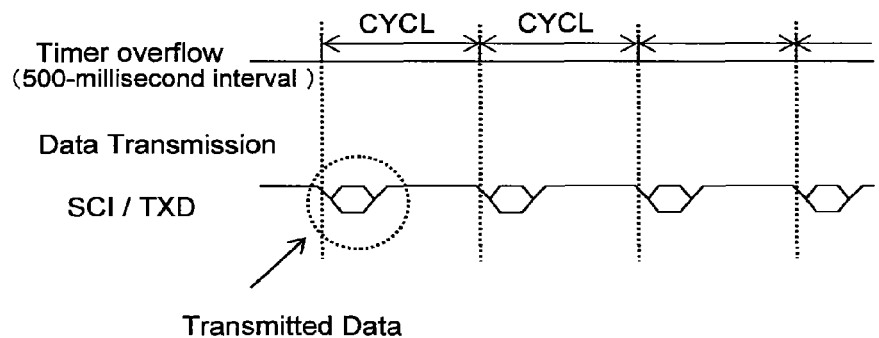
FIG. 19 is a timing chart of the operation shown in FIG. 18.
Figure 20:
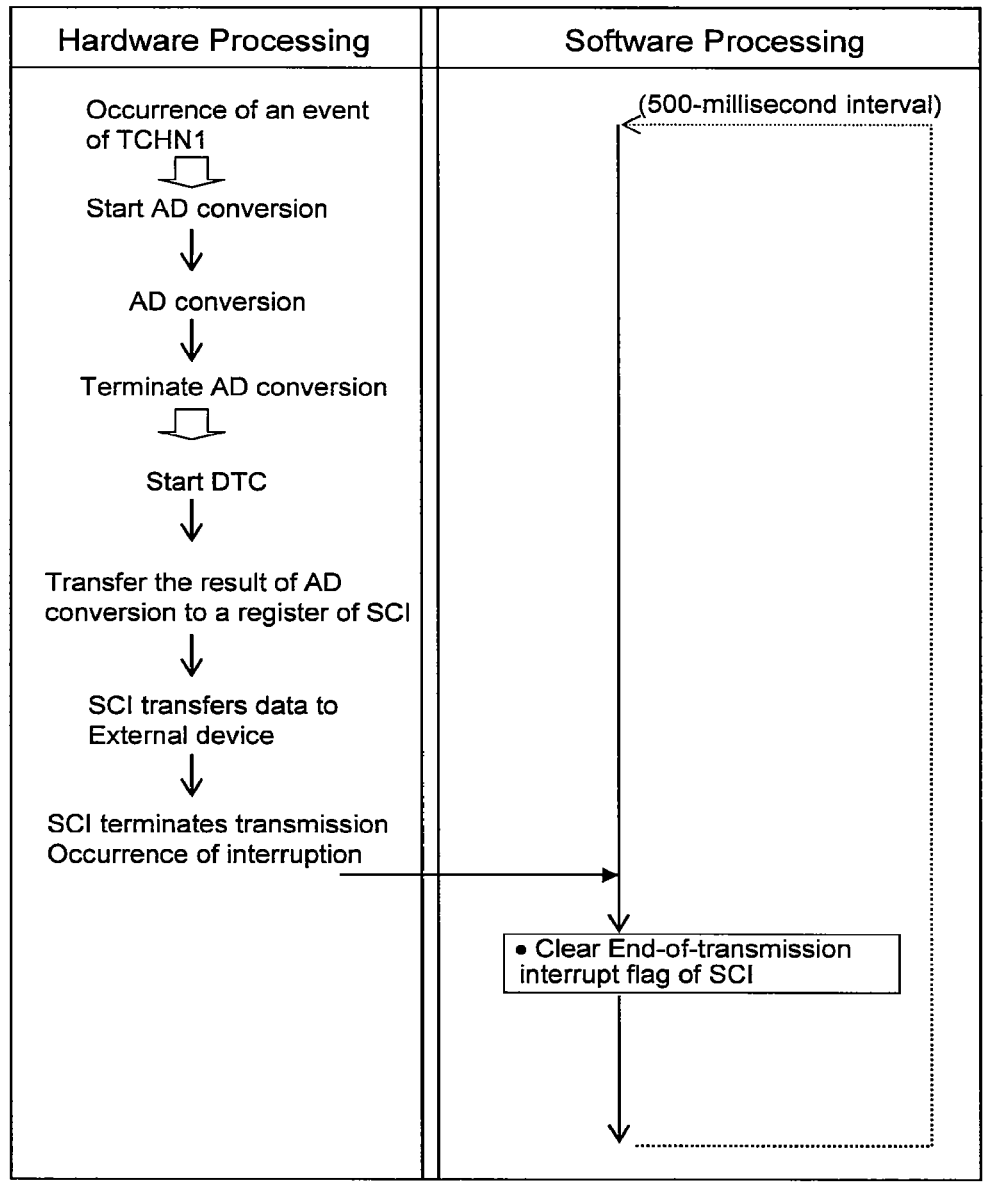
FIG. 20 is a diagram showing the control flow of the operation including the measurement and communication according to the event link method.
Figure 21:
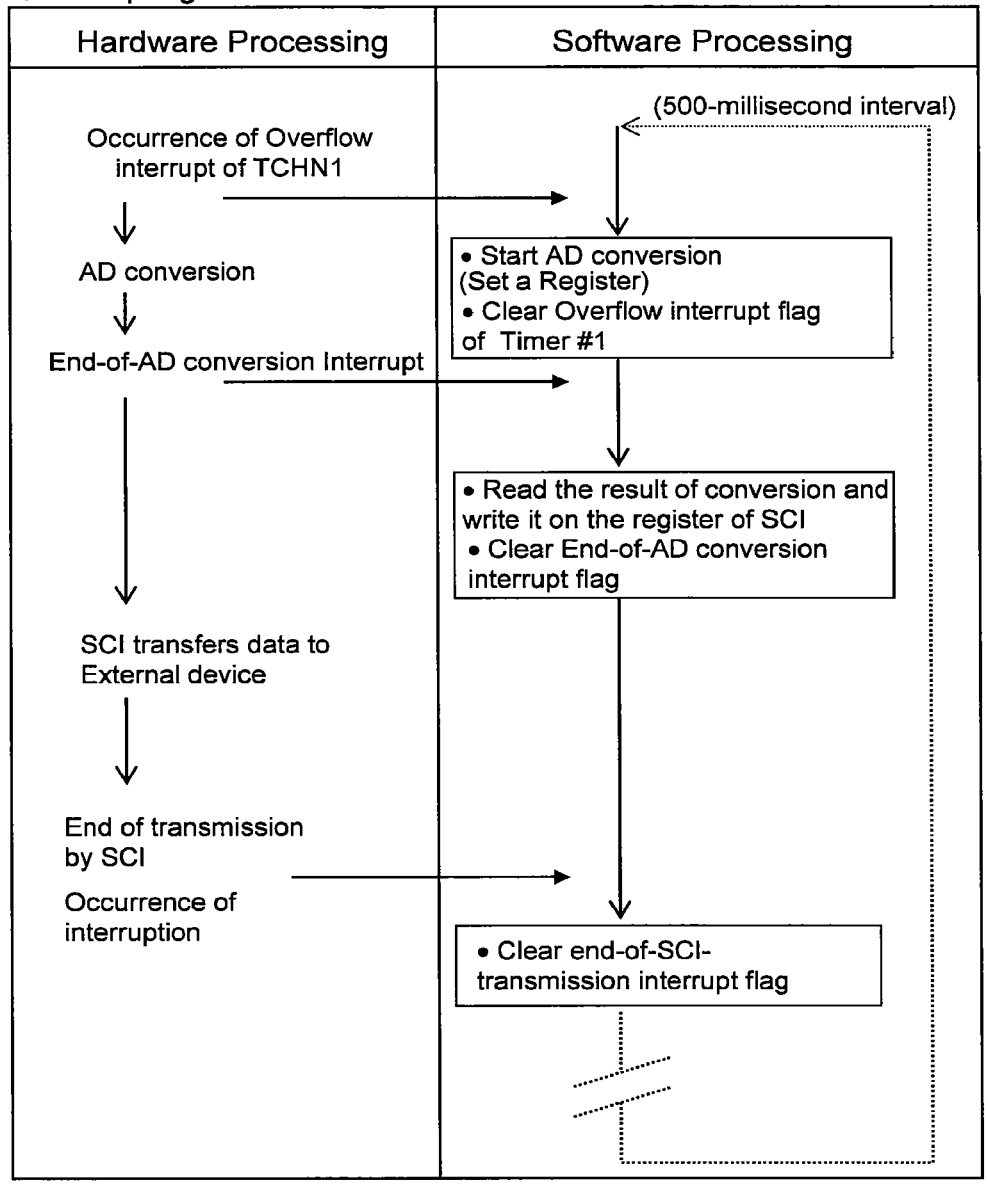
FIG. 21 is a flow chart showing, as a comparative example, the control flow when the control shown with reference to FIG. 20 is all performed by means of interrupt processing.

Referring to FIG. 18, an example of application of the invention to an operation including measuring a temperature around (or outside) the chip and communicating the result of the measurement to an external device at fixed intervals is shown. A voltage at a terminal of the thermistor 50 is input to the analog-to-digital converter 14. The result of the conversion is output through the serial communication interface circuit (SCI) 16 to the external device (EXDVC) 51. For the period of the operation, a first timer channel TCHN1 of the timer 17 is used. What is shown in FIG. 18 is comparable to the microcomputer 1 shown in FIG. 1, however the drawing of bus connection, etc. is simplified therein. Under the control of the CPU 2, the initial setting to make the timer 17 perform the timer operation for a given time is made, and a condition required for controlling data transfer is initially set on the RAM 4. When the CPU 2 directs start of the timer operation, the timer 17 uses the timer channel TCHN1 to output an event signal EVT_A at every time-out. In response to the event signal EVT_A, the event link controller 6 sends a start control signal STR_A to the analog-to-digital converter (A/D) 14. Then, the converter 14 converts a terminal voltage of the thermistor 50 to a digital data, and outputs an event signal EVT_B after completion of the conversion. In response to the event signal EVT_B, the event link controller 6 sends a start control signal STR_B to the data transfer control circuit (DTC) 3. The data transfer control circuit (DTC) 3 transfers the result-of-conversion data by the analog-to-digital converter 14 to a data output register of serial communication interface circuit (SCI) 16 according to the data transfer control condition of the RAM 4, and outputs an event signal EVT_C after completion of the transfer. The event link controller 6 sends a transfer start control signal STR_C to the serial communication interface circuit (SCI) 16, and makes the SCI 16 output the data in the data output register to the external device 51. After the transfer, when a request for interruption is made by the serial communication interface circuit (SCI) 16, the timer operation is set again, whereby the above-described operation is repeated. As shown in the example of FIG. 19, this operation is carried out in every timer cycle, and thus the external device 51 can gain data of temperature measurements by the thermistor 50 in every timer cycle (CYCL). This operation is terminated by the CPU 2 when the CPU 2 stops the timer operation involving the timer channel TCHN1. FIG. 20 shows the control flow of the above-described operation including the measurement and communication by the event link method. FIG. 21 shows, as a comparative example, the control flow when this control is all performed by means of interrupt processing. Using the event link method likewise can shorten a software processing time of the CPU 2 and reduce the load on the CPU in comparison to the interrupting method. In this case, the CPU 2 is allowed to execute another software process during the time of control by the event link controller. Hence, it becomes possible to take advantage of a hardware resource.

Figure 22:
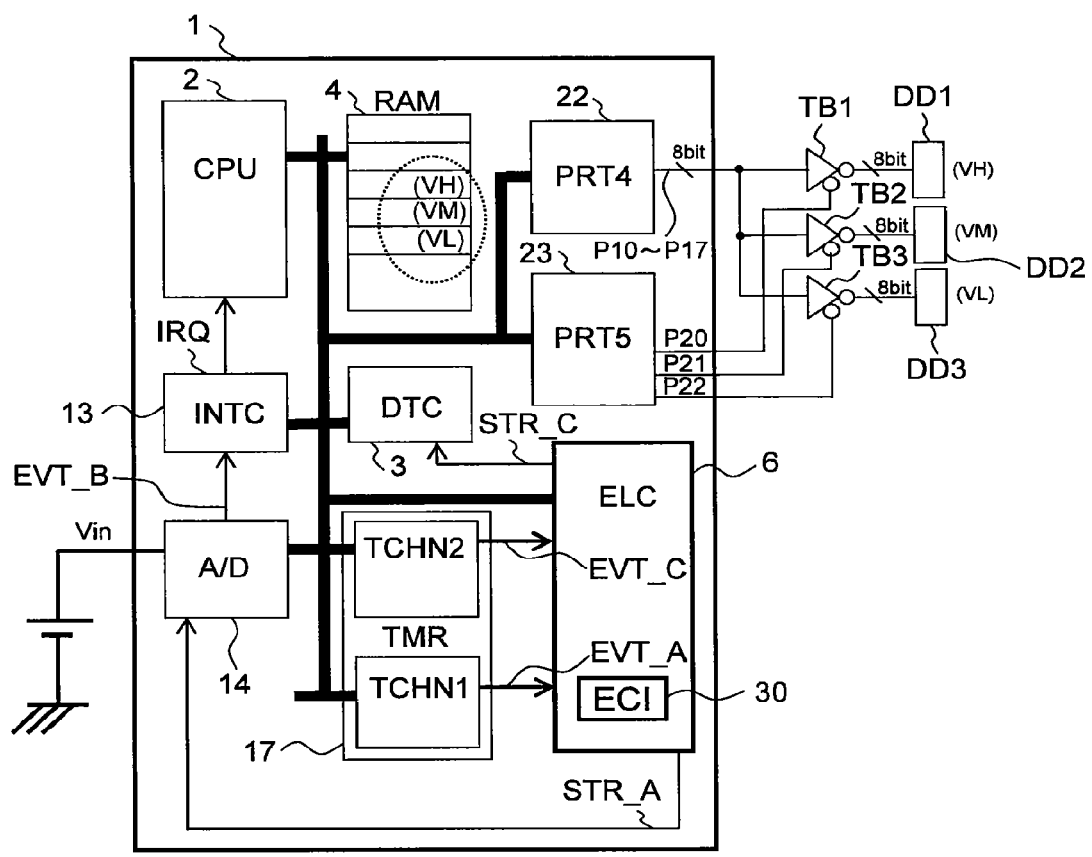
FIG. 22 is a block diagram showing an example of application to the case where a value gained by measurement of an input voltage is represented in three digits by dynamic lighting.
Figure 23:
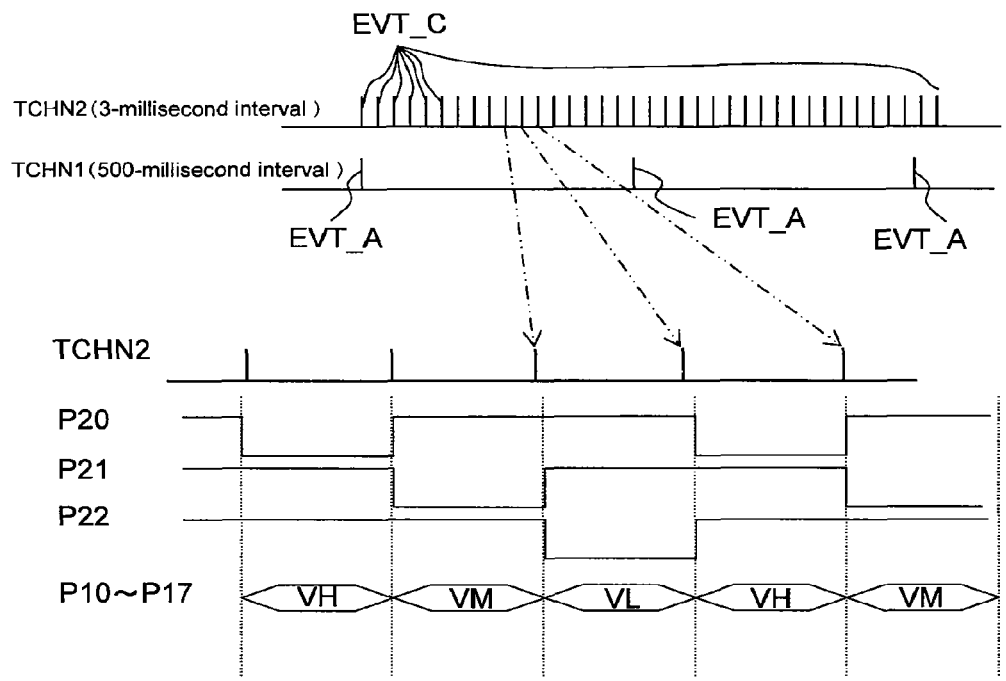
FIG. 23 is a timing chart of the operation of the dynamic lighting described with reference to FIG. 22.

Referring to FIG. 22, an example of application to the case where a value gained by measurement of an input voltage is represented in three digits by dynamic lighting is shown. The reference signs TB1 to TB3 each denote a tri-state buffer of eight bits. Further, the reference signs DD1 to DD3 each denote a display device which uses seven segments to display one digit of a numeral. Data input terminals of the tri-state buffers TB1 to TB3 are commonly connected to a 8-bit output of the port 22 (PRT4). Control terminals of the tri-state buffers TB1 to TB3 are connected to output terminals of the port PRT23 respectively. In regard to this operation, the CPU 2 makes initial settings on the port 22 (PRT4) and port 23 (PRT5) so that the port 22 (PRT4) and port 23 (PRT5) are in a static output mode, in which latched data in their port data registers PDR are output statically. In addition, the CPU 2 sets a required data transfer control condition and control data to be output through the port 23 (PRT5) on the RAM 4 initially. After receiving a direction to start the timer operation from the CPU 2, the timer 17 outputs an event signal EVT_A at the time of time-out of the timer channel TCHN1. In response to the event signal EVT_A, the event link controller 6 provides a start control signal STR_A to the analog-to-digital converter 14. Then, the analog-to-digital converter 14 converts an input voltage Vin into digital data, and after completion of the conversion, outputs an event signal EVT_B. In response to the event signal EVT_B, the interrupt controller 13 outputs an interrupt signal IRQ to the CPU 2. In response to the cause of interrupt, the CPU 2 produces three digits of display data VH, VM and VL which represent the value of the input voltage Vin based on the data resulting from the analog-to-digital conversion, and stores the display data in given regions of the RAM 4. The timer cycle of the timer channel TCHN1 is e.g. 500 milliseconds. When the timer channel TCHN2 reaches time-out, the timer 17 outputs an event signal EVT_C. In response to the event signal EVT_C, the event link controller 6 provides a start control signal STR_C to the data transfer control circuit (DTC) 3. The data transfer control circuit (DTC) 3 transfers display data stored in the given regions of the RAM 4 to the port data register of the port 22 (PRT4), according to the data transfer control condition held in the RAM 4, and transfers tri-state control data to a buffer data register of the port 23 (PRT5). While the operation is repeated in every timer cycle of the timer channel TCHN2, the display data and tri-state control data transferred each time are arranged so that the digit targeted for display varies each time display is performed. For instance, as shown in the example of FIG. 23, the display data VH of the most significant digit is displayed during a period of time when the output control data of the terminal P20 is at Low level, the display data VM of the middle significant digit is displayed during a period of time when the output control data of the terminal P21 is at Low level, and the display data VL of the least significant digit is displayed during a period of time when the output control data of the terminal P22 is at Low level.

Figure 24:
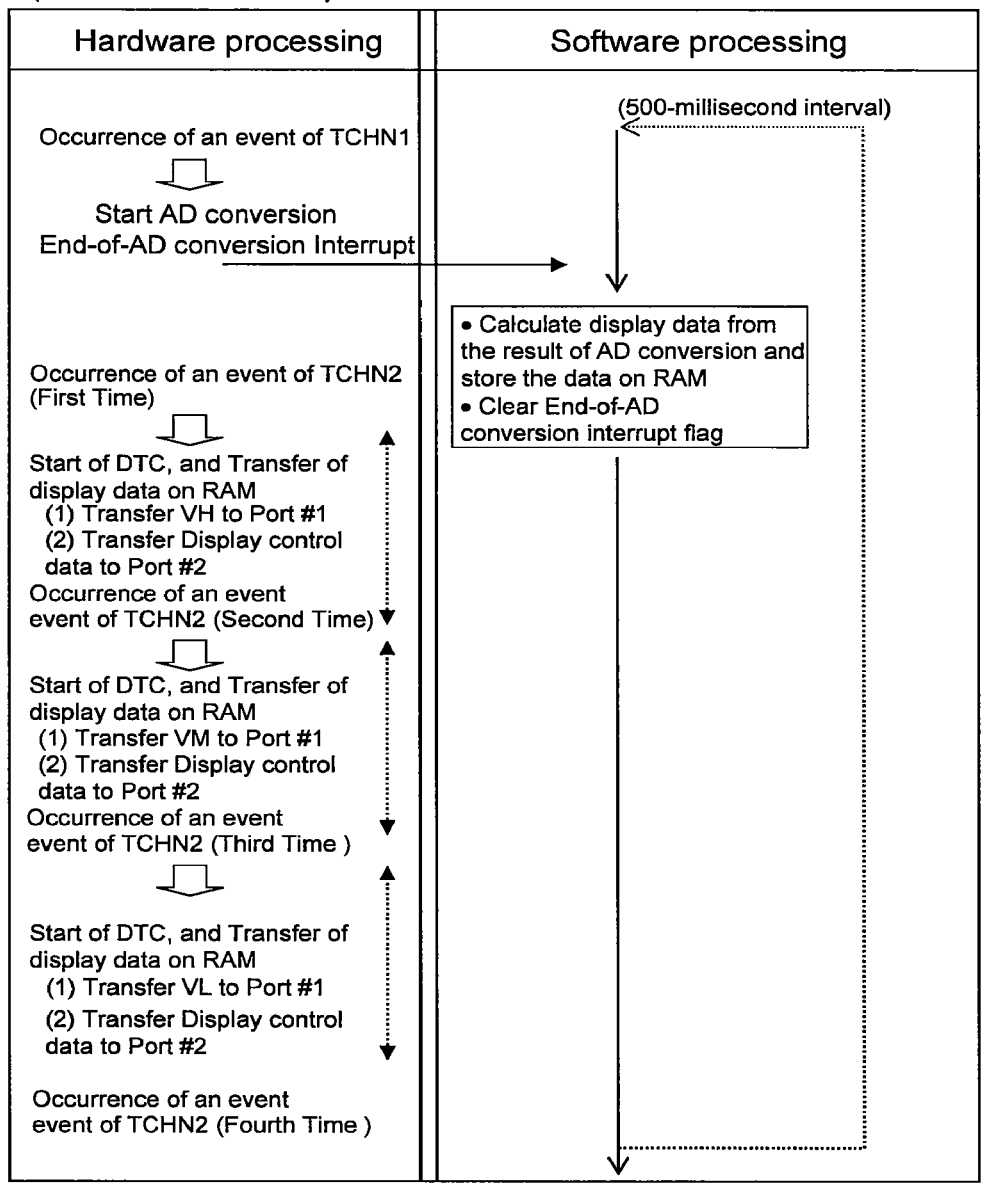
FIG. 24 is a flow chart showing the control flow of the operation including the measurement and display according to the event link method.
Figure 25:
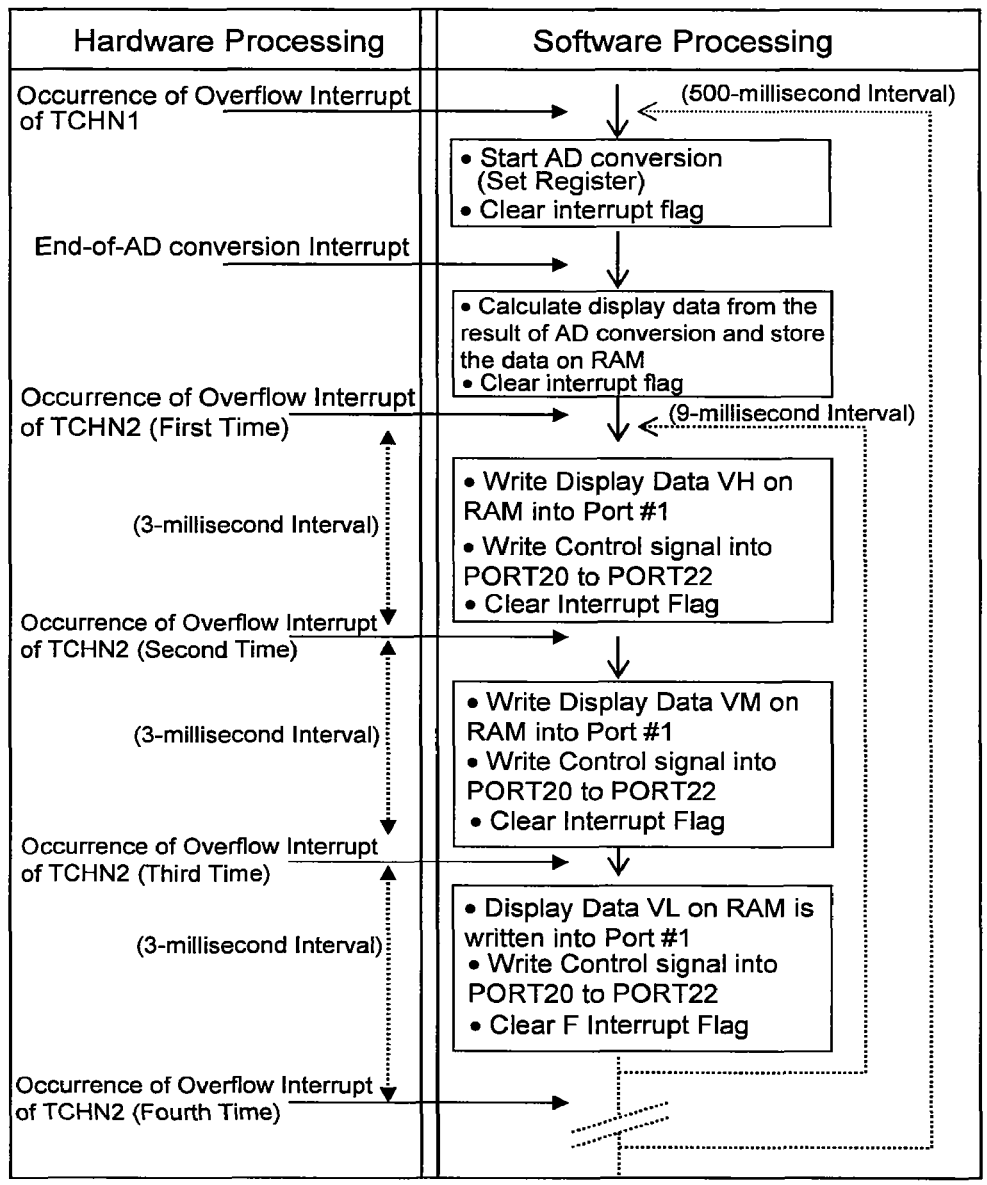
FIG. 25 is a flowchart showing, as a comparative example, the control flow when the control shown with reference to FIG. 24 is all performed by means of interrupt processing.

Referring to FIG. 24, the control flow of the operation including the measurement and display according to the event link method is shown. FIG. 25 shows, as a comparative example, the control flow when this control is all performed by means of interrupt processing. Using the event link method likewise can shorten a processing time of the CPU 2 and reduce the load on the CPU in comparison to the interrupting method.

Figure 26:
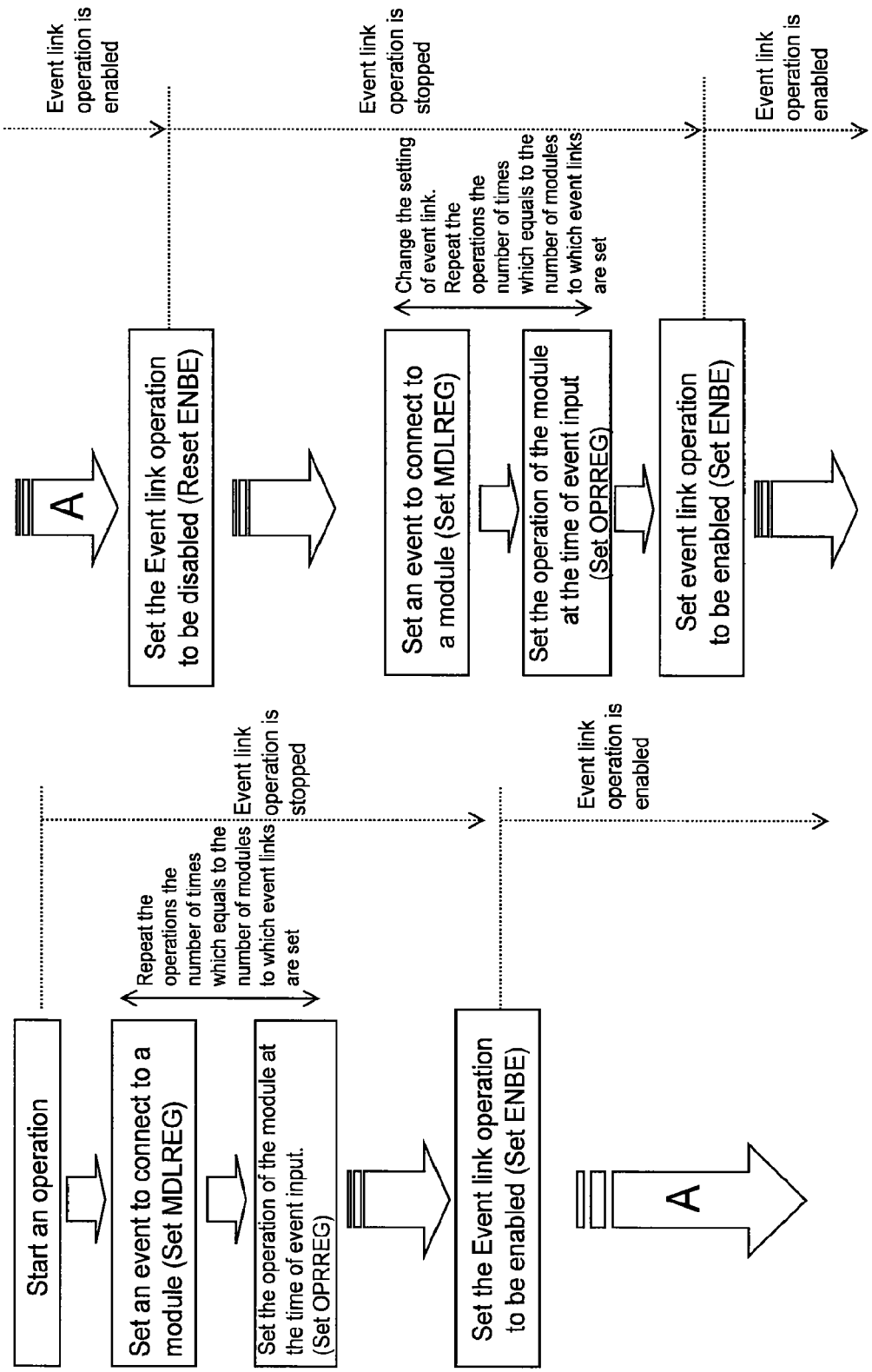
FIG. 26 is a flow chart showing an example of the flow of an operation to set the event control information.

Referring to FIG. 26, the flow of an operation to set the event control information ECI is shown. The initial setting of the event control information ECI is performed by the CPU 2 in response to power-on reset. During the setting operation, an event link operation is disabled. After that, the event link operation can be stopped to reset the event control information ECI under the control of the CPU 2. In order to disable the event link operation, it is sufficient to reset an enable flag ENBE of the register 33, i.e. to set the flag to a disable level.

Figure 27:
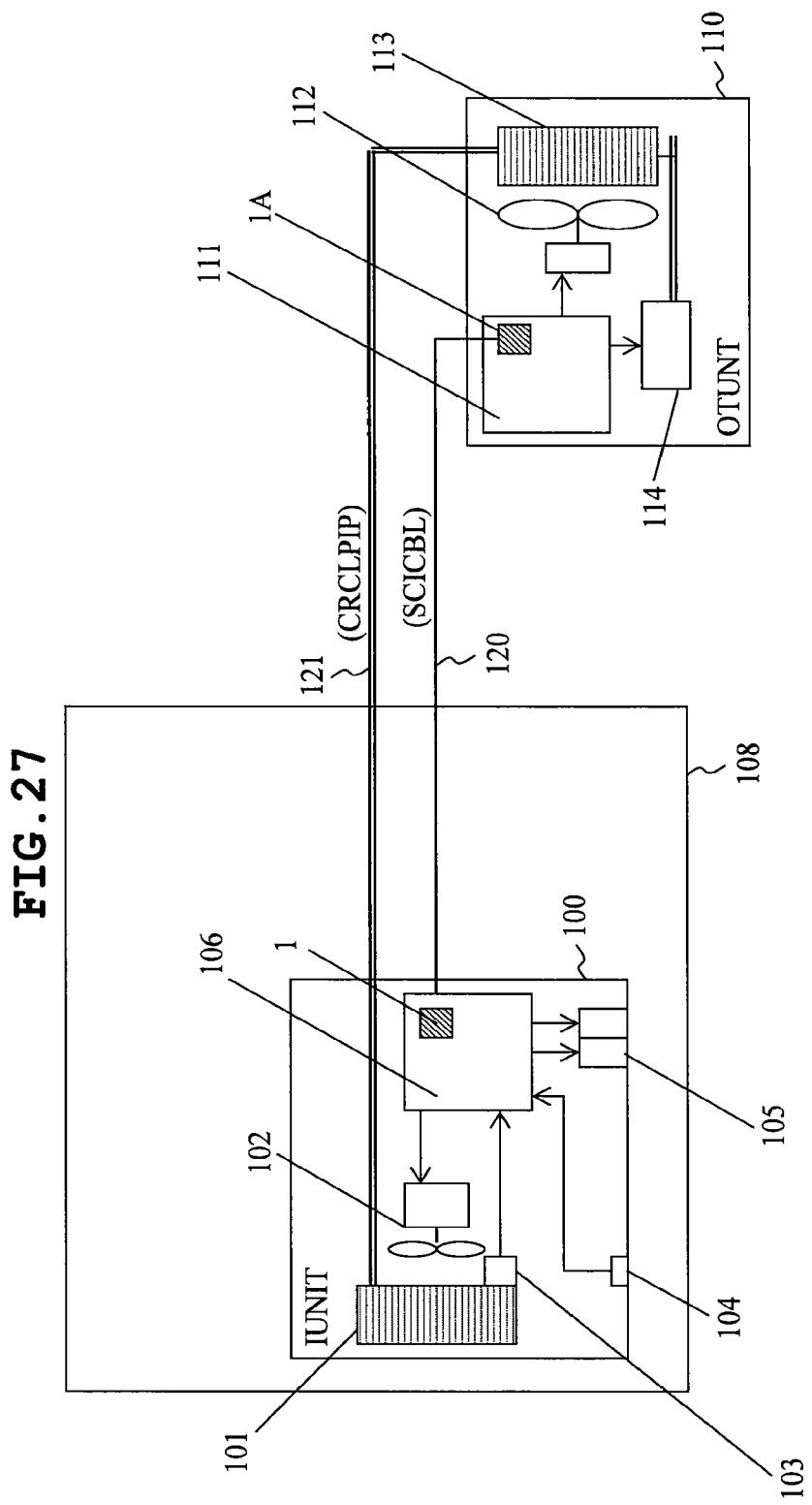
FIG. 27 is a block diagram of an air conditioning apparatus which is an example of a control system incorporating the microcomputer.

Referring to FIG. 27, an air conditioning apparatus is shown as an example of a control system equipped with the microcomputer 1. The air conditioning apparatus is primarily composed of an indoor unit (INUNT) 100 placed inside a room 108 and an outdoor unit (OUTUNT) 110 placed in the outside of the room. The indoor unit 100 and outdoor unit 110 are connected through a coolant-circulation pipe (CRCLPIP) 121 and a serial communications cable (SCICBL) 120 with each other.

The indoor unit 100 has a heat exchanger 101, a blower fan 102, a heat exchanger temperature sensor 103, a room temperature sensor 104, an indoor temperature indicator 105, and a control board 106. The control board 106 is mounted with the microcomputer 1, a buffer and a driver, which are used for connecting the microcomputer 1 to an external device, a power-supply circuit, etc.

The outdoor unit 110 has a control board 111, a compressor 114, a heat exchanger 113, and a heat-exhausting fan 112. The control board 111 is mounted with a microcomputer 1A used as a controller, a buffer and a driver, which are used for connecting the microcomputer to an external device, a power-supply circuit, etc. The microcomputer 1 may be adopted as the microcomputer 1A.

A gaseous coolant for heat exchange is circulated through the pipe 121 between the outdoor unit 110 and indoor unit 100. Further, the microcomputers 1 and 1A communicate with each other through the serial cable 120.

Now, the control of the temperature in the room will be outlined below. The temperature-setting control of the indoor unit 100 is performed using a remote controller, and the control information is input to the microcomputer 1. The microcomputer 1 uses the temperature sensors 103 and 104 attached to the indoor unit 100 to measure the temperature inside the room 108 and the temperature of the heat exchanger 101, and performs the control to make the temperature indicator 105 of the indoor unit 100 indicate the temperatures. In addition, the microcomputer 1 transmits the values of a temperature set with the remote controller, a room temperature, and the temperature of the heat exchanger to the microcomputer 1A of the outdoor unit 110 through the serial cable 120. The microcomputer 1A controls the compressor 114 for compressing the gaseous coolant and the fan 112 for heat exhaustion based on the received data, thereby to control the temperature inside the room 108 through the heat exchanger 113.

Figure 28:
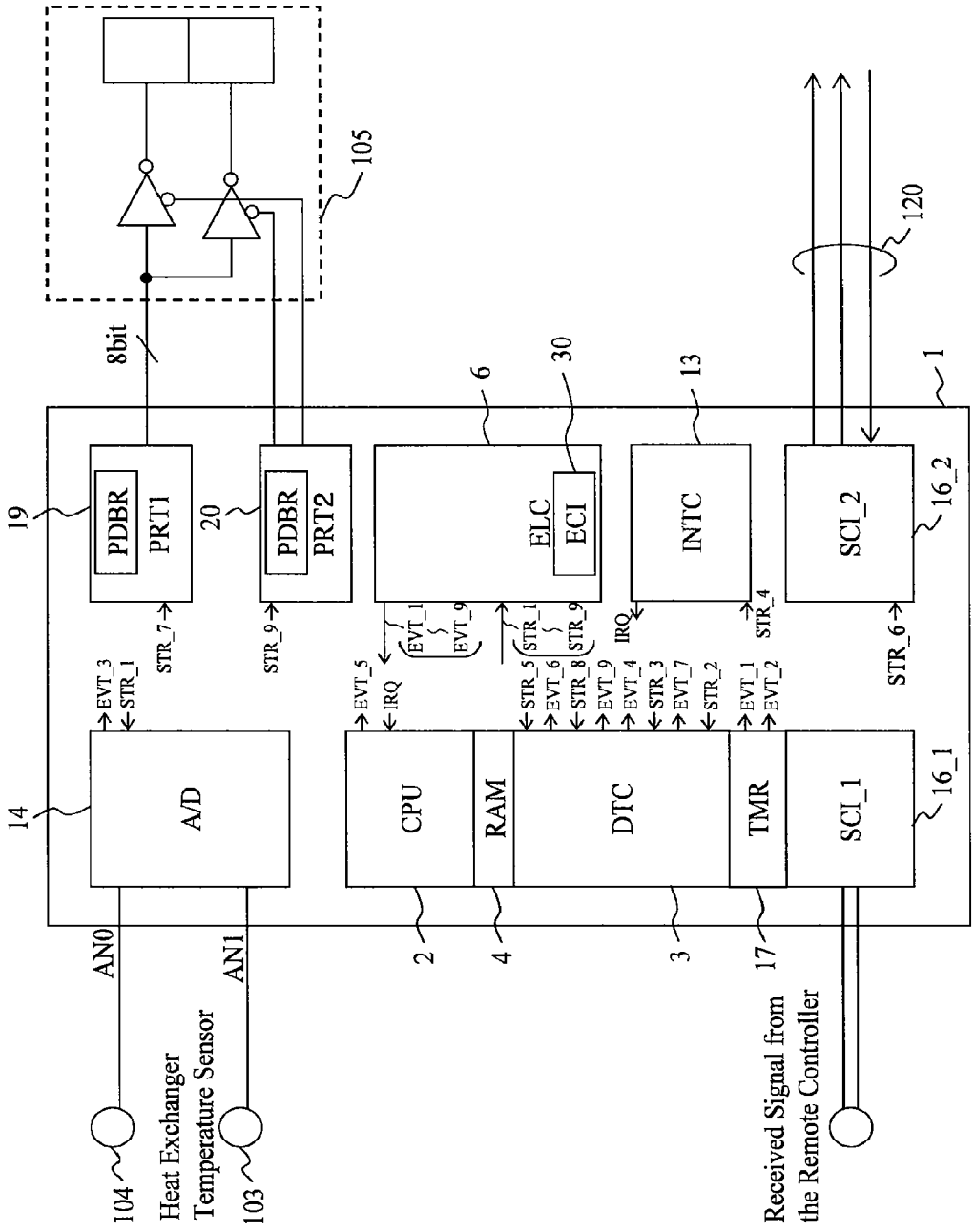
FIG. 28 is a block diagram showing an example of a control system of the air conditioning apparatus shown in FIG. 27 in detail with the focus on the microcomputer.

Referring to FIG. 28, the details of the control system is shown with the focus on the microcomputer 1. The serial communication interface circuit 16 shown in the drawing includes a communication channel (SCI_1) 16_1 for receiving a signal from the remote controller and a communication channel (SCI_2) 16_2 for communicating with the outdoor unit. The analog-to-digital converter (A/D) 14 has an analog-to-digital conversion channel for the room temperature sensor and an analog-to-digital conversion channel for the heat exchanger temperature sensor. As stated above, the microcomputer 1 includes the event link controller 6 in addition to the interrupt controller 13. The event control information (ECI) 30_1 shown in the example of FIG. 28 defines the relation between event signals and start control signals for controlling the temperature of the air conditioner, which is initially set e.g. in the power-on reset processing.

Figure 29:
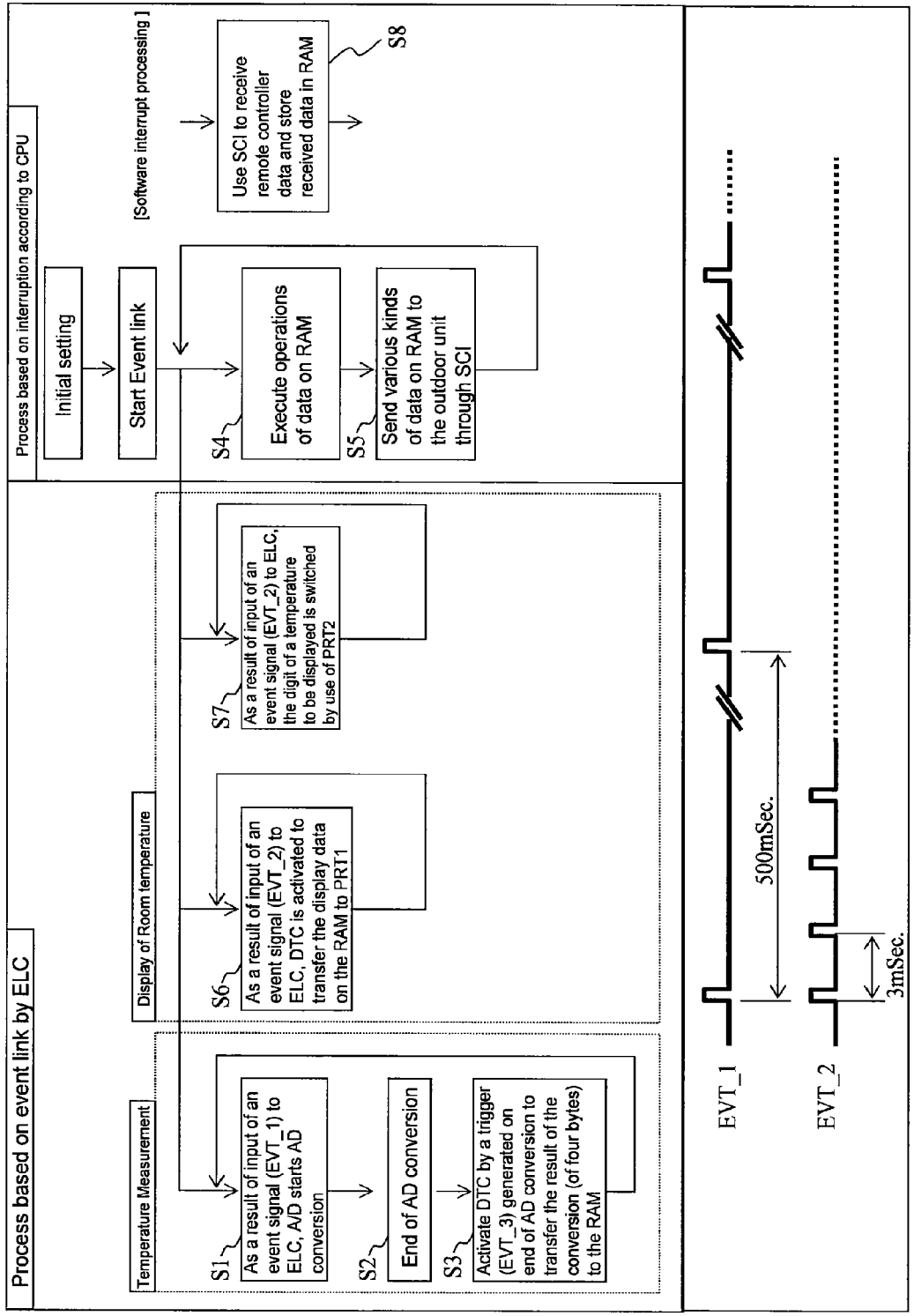
FIG. 29 is a flow chart showing an example of the control procedure to control the room temperature according to the event control information using the air conditioner.

Referring to FIG. 29, an example of the control procedure to control the temperature inside the room according to the event control information 30_1 using the air conditioner is shown. The timer 17 generates an event signal EVT_1 at the intervals of 500 milliseconds and an event signal EVT_2 at the intervals of 3 milliseconds according to the initial setting by the CPU 2.

The control of the room temperature by the air conditioner is primarily divided into a process based on the interrupt processing of the CPU 2 and a process based on event link by the event link controller (ELC) 6.

When an event signal EVT_1 is input to the event link controller (ELC) 6, the analog-to-digital converter (A/D) 14 receives a start control signal STR_1 and converts signals output by the sensors 103 and 104 to digital form (S1). After completion of the conversion, the converter 14 outputs an event signal EVT_3 (S2). When the event signal EVT_3 is input to the event link controller (ELC) 6, the data transfer control circuit (DTC) 3 receives a start control signal STR_3 and transfers the result of the conversion by the analog-to-digital converter (A/D) 14 to the RAM 4. After completion of the conversion, the data transfer control circuit 3 outputs an event signal EVT_4 (S3).

When an event signal EVT_4 is input to the event link controller (ELC) 6, a request for interruption is made to the interrupt controller (INTC) 13 by means of a start control signal STR_4. The interrupt controller 13 responds to the interruption to send an interrupt signal IRQ to the CPU 2, whereby an interrupt process corresponding to the cause of interrupt is started. In the interrupt process in this case, temperature-indication data, etc. are produced based on the after-conversion data, and the temperature-indication data thus produced are stored in the RAM together with the result-of-conversion data (S4). The result-of-conversion data stored in the RAM is transmitted through the communication channel SCI_2 to the microcomputer of the outdoor unit (S5). After the completion of the interrupt process, the CPU is returned to the state just before occurrence of the interruption of question. Incidentally, the CPU may be returned from the interrupt process at the time of completion of the processing at Step S4. In that case, the processing at Step S5 may be performed in response to generation of another event signal with respect to the event link controller (ELC) 6. For instance, a series of the following four steps may be adopted. The first step includes making the CPU 2 output an event signal EVT_5 to the event link controller (ELC) 6 at the end of the interrupt process. The second step includes using a start signal STR_5 produced in response to the event signal to cause the data transfer control circuit (DTC) 3 to transfer the result-of-conversion data to the communication channel SCI_2. The third step includes making the data transfer control circuit 3 output an event signal EVT_6 to the event link controller (ELC) 6 in synchronization with the termination of the transfer. The fourth step includes using a start control signal STR_6 produced in response to the event signal EVT_6 to output the result-of-conversion data through the communication channel SCI_2. After that, when an event signal EVT_2 is input to the event link controller 6, the data transfer control circuit (DTC) 3 transfers the temperature-indication data of the RAM to the port data buffer register PDBR of the port (PRT1) 19 in response to a start signal STR_2. In synchronized with the termination of the transfer, the event link controller 6 outputs an event signal EVT_7. On receipt of a start control signal STR_7 produced in response to the event signal EVT_7, the port (PRT1) 19 outputs temperature-indication data (S6). Likewise, when an event signal EVT_2 is input to the event link controller 6, the data transfer control circuit (DTC) 3 transfers subsequent digit-indication control data on the RAM to the port data buffer register PDBR of the port (PRT2) 20 in response to a start signal STR_8. In synchronization with the termination of the transfer, an event signal EVT_9 is output to the event link controller 6. On receipt of a start control signal STR_9 produced in response to the event signal EVT_9, the port (PRT2) 20 outputs a digit-indication control data (S7). The room temperature indication control at Steps S6 and S7 is classified into the same type of indication control as that in the case of dynamic lighting of two or more digits as described with reference to FIGS. 22 and 23.

When the data sent out by the remote controller is received by the communication channel SCI_1, a request for interruption is made to the CPU 2, and the received data is stored in the RAM (S8).

With the air conditioning apparatus as described above, as the event link controller 6 and the interrupt controller 13 are adopted, the following are made possible in the process including acquiring temperature data (result-of-conversion data) from outputs of the sensors 103 and 104, producing temperature-indication data based on this temperature data, and supplying the resulting temperature data and temperature-indication data: to parallelize processes to respond to two or more events; to speed up the response to occurrence of an event; and to reduce the load on the CPU 2 in responding to occurrence of an event. Therefore, the efficiency of data processing of the air conditioning apparatus can be increased on the whole.

Figure 30:
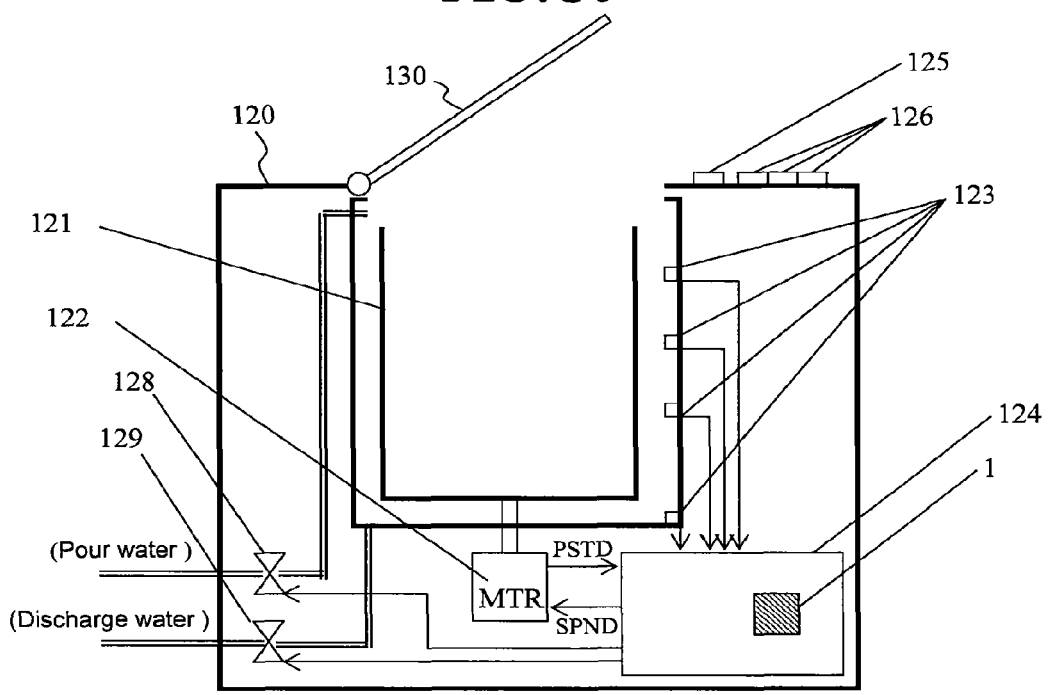
FIG. 30 is a block diagram showing a laundry machine as an example of a control system incorporating the microcomputer.

Referring to FIG. 30, a laundry machine is shown as an example of a control system incorporating the microcomputer 1. The laundry machine 120 has a washing tub 121, a brushless DC motor (MTR) 122, water-level sensors 123, a control board 124, an indicator 125, an input switch 126 with a key matrix (KYMTRX), a water-filling valve 128, a scupper valve 129, and a cover 130. The control board 124 is mounted with the microcomputer 1, buffers for connecting the microcomputer 1 with the sensors 123, a driver for the motor 122, a power-supply circuit, etc.

The outline of laundry control by the laundry machine 120 is as follows. Laundry conditions (including a washing time, whether dewatering is performed or not, whether drying is performed or not, etc.) are set by use of the switch 126. The microcomputer 1 controls the laundry state according to the details thus set. Specifically, when a laundry start switch is pushed, laundry control is started. First, the water-filling valve 128 is opened. When the water poured into the washing tub reaches a given water level, the valve 128 is closed, and then the motor 122 starts driving and turning of the washing tub 121. Until a set time has elapsed, the motor 122 repeats forward turning and backward turning of the washing tub 121. During this period, the time remaining before the completion of laundry is displayed by the indicator 125.

Referring to FIG. 31, the details of the control system is shown with the focus on the microcomputer 1. Two bits of the port (PRT1) 19 and port (PRT2) 20 are used for dynamic lighting of the indicator 125. Three bits of the port (PRT2) 20 are used for input of a rotor turning position signal (STD) of the motor 122. The port (PRT3) 21 outputs a drive signal (SPND) for the motor 122. The port (PRT4) 22 outputs key scan data (KYSCN) and receives an input of key input data (KYIPT) for the key matrix of the input switch 126. As described above, the microcomputer 1 includes the event link controller 6 in addition to the interrupt controller 13. The event control information (ECI_1) 30_2 shown in the example of FIG. 31 defines the relation between event signals and start control signals for laundry control of the laundry machine, which is initially set by the CPU 2 or the like e.g. in the power-on reset processing.

Figure 32:
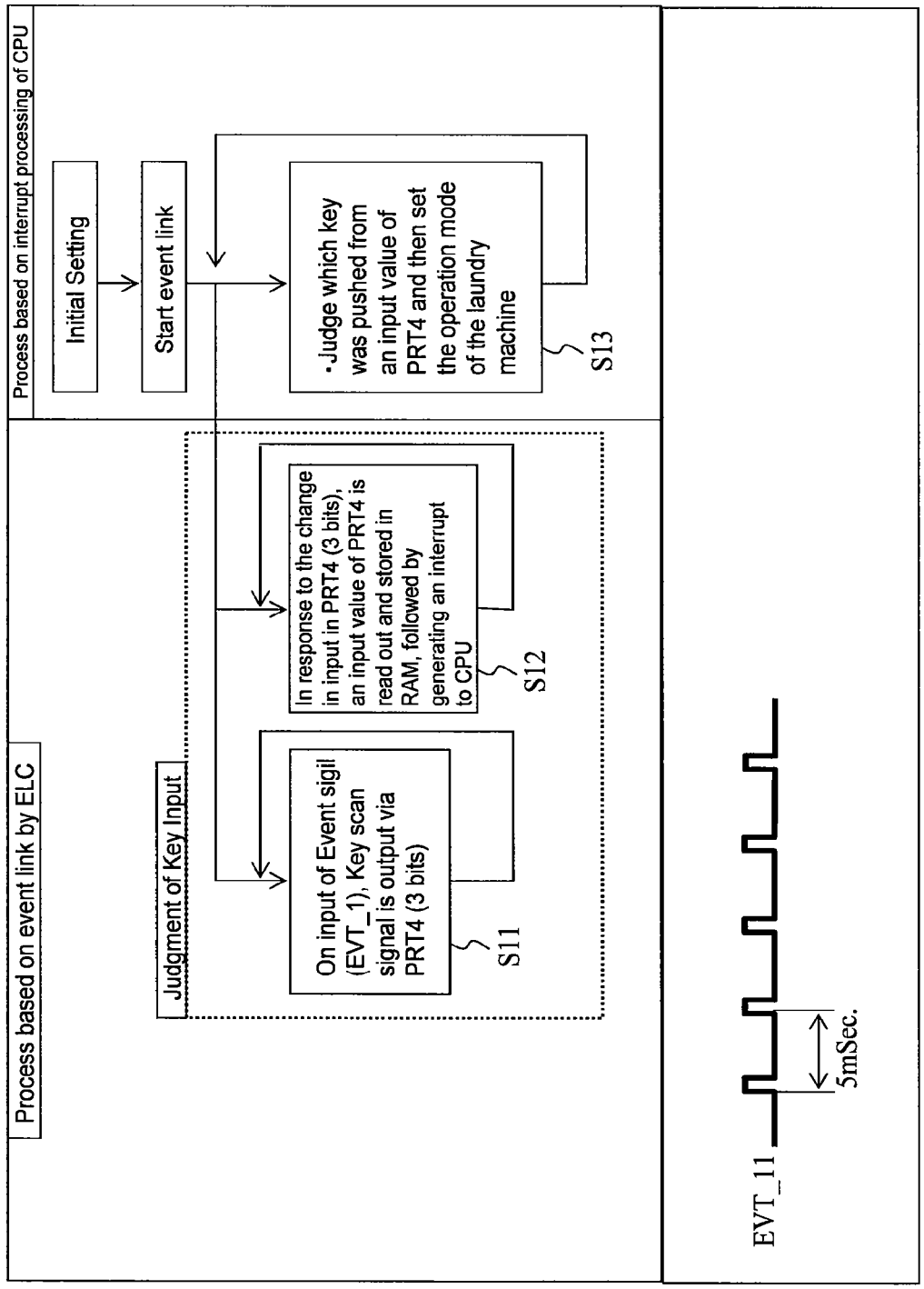
FIG. 32 is a flow chart showing an example of the input control procedure of the laundry machine according to the event control information.

Referring to FIG. 32, an example of the input control procedure according to the event control information 30_2 is shown. According to the initial setting by the CPU 2, the timer 17 generates an event signal EVT_11 at the intervals of 5 milliseconds.

The input control is primarily divided into a process based on the interrupt processing of the CPU 2 and a process based on event link by the event link controller 6.

When an event signal EVT_11 is input to the event link controller 6, the data transfer control circuit (DTC) 3 transfers key scan data to the port data buffer register of the port PRT4 in response to a start signal STR_11. In synchronization with the termination of the transfer, an event signal EVT_14 is output to the event link controller 6. On receipt of a start control signal STR_14 produced in response to this, the port PRT4 outputs key scan data to the input device 126 (S11). Also, in response to the change of input, the port PRT4 outputs an event signal EVT_15 to the event link controller 6. On receipt of a start control signal STR_15 produced in response to this, the data transfer control circuit (DTC) 3 transfers key input data of the port PRT4 to the RAM 4 (S12). After completion of transfer, the data transfer control circuit (DTC) 3 outputs an event signal EVT_16 to the event link controller 6. In response to this, the event link controller 6 issues a start control signal STR_16 thereby to make a request for interruption to the interrupt controller 13. The interrupt controller 13 supplies an interrupt signal IRQ to the CPU 2 in response to the interruption, thereby to start an interrupt process depending on the corresponding cause of interrupt. In the interrupt process in this case, the operation mode of the laundry machine is set based on the key input data stored in the RAM 4 (S13). The laundry machine starts an operation depending on the set operation mode.

Figure 33:
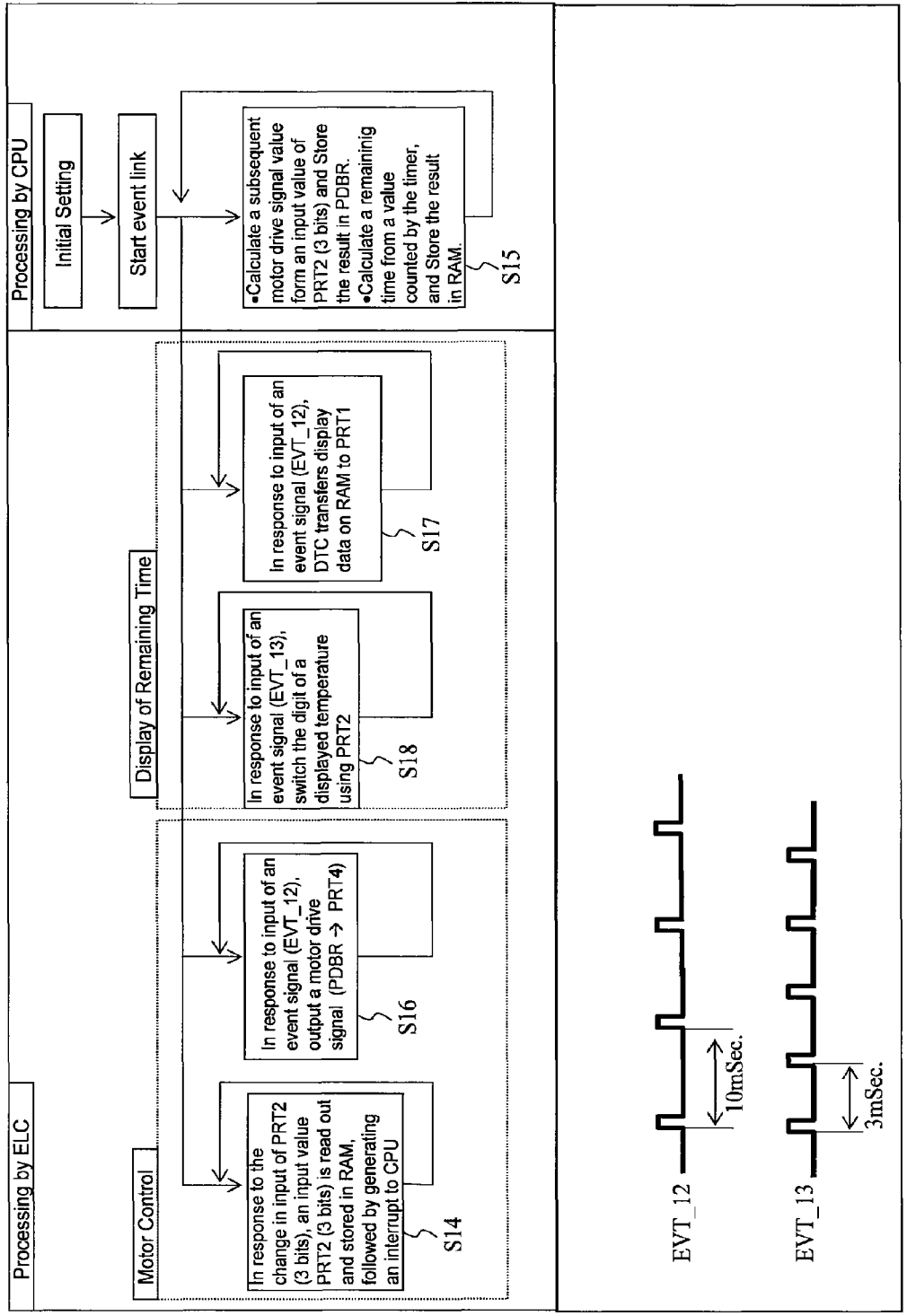
FIG. 33 is a flow chart showing an example of the control procedure for mode control according to the event control information and an example of the control procedure for displaying a remaining time.

Referring to FIG. 33, an example of the control procedure for mode control according to event control information 30_2 and an example of the control procedure for displaying a remaining time when the laundry operation mode is specified are shown. According to the initial setting by the CPU 2, the timer 17 generates an event signal EVT_12 at the intervals of 10 milliseconds, and an event signal EVT_13 at the intervals 3 milliseconds.

In response to the change in the rotor turning position signal (PSTD) input to the port PRT2, the port PRT2 outputs an event signal EVT_17 to the event link controller 6. On receipt of a start control signal STR_17 produced in response to this, the data transfer control circuit (DTC) 3 transfers a rotor turning position signal in the port PRT4 to the RAM 4 (S14). After completion of the transfer, the data transfer control circuit (DTC) 3 further outputs an event signal EVT_18 to the event link controller 6. On receipt of a start control signal STR_18 produced in response to this, the event link controller 6 makes a request for interruption to the interrupt controller 13. The interrupt controller 13 supplies an interrupt signal IRQ to the CPU 2 in response to the interruption thereby to start an interrupt process depending on the corresponding cause of interrupt. In the interrupt process in this case, the subsequent motor drive signal (SPND) is calculated based on the rotor turning position signal (PSTD) stored in the RAM 4, and stored in the port data buffer register of the port PRT3. Further, the time remaining before completion of the laundry is calculated by the four arithmetic operations form a value counted by the timer 17 which has started measuring elapse of time from the beginning of laundry, and the resultant remaining time data is stored in the RAM 4 (S15). The laundry machine starts an operation depending on the set operation mode. When a given interrupt process is completed, the process by the CPU 2 is returned to a process just before the interrupt process.

When an event signal EVT_12 is input to the event link controller 6, the port PRT3_21 receives a start control signal STR_12 produced in response to this, and outputs a motor drive signal (SPND) in the port data buffer register toward the motor 122 (S16).

On the other hand, when an event signal EVT_12 is input to the event link controller 6, the data transfer control circuit (DTC) 3 receives a start signal STR_12 produced in response to this, and transfers remaining time data on the RAM to the port data buffer register of the port (PRT1) 19. In synchronization with the termination of the transfer, the data transfer control circuit 3 is made to output an event signal EVT_19 to the event link controller 6. On receipt of a start control signal STR_19 produced in response to this, the port (PRT1) 19 outputs remaining time data (S17). When an event signal EVT_13 is input to the event link controller 6, the data transfer control circuit (DTC) 3 receives a start signal STR_13 produced in response to this, and transfers the subsequent digit-indication control data on the RAM to the port data buffer register of the port (PRT2) 20. In synchronization with the termination of the transfer, the data transfer control circuit 3 is made to output an event signal EVT_20 to the event link controller 6. On receipt of a start control signal STR_20 produced in response to this, the port (PRT2) 20 outputs a digit-indication control data (S18). The remaining time display control at Steps S17 and S18 is classified into the same type of display control as that in the case of dynamic lighting of two or more digits as described with reference to FIGS. 22 and 23.

With the laundry machine as described above, as the event link controller 6 and the interrupt controller 13 are adopted, the following are made possible in the process including acquiring a rotor position-detecting signal, producing subsequent motor drive data based on the rotor position-detecting signal thus acquired, and supplying the produced motor drive data and remaining time display data: to parallelize processes to respond to two or more events; to speed up the response to occurrence of an event; and to reduce the load on the CPU 2 in responding to occurrence of an event. Therefore, the efficiency of data processing of the laundry machine can be increased on the whole. The efficiency of data processing in key input control can be increased by adopting the interrupt controller 13 and event link controller 6.

While the invention made by the inventor has been described above based on the embodiments specifically, the invention is not so limited. It is needless to say that various modifications and changes may be made without departing from the subject matter hereof.

The invention is, for instance, applicable to not only a microcomputer but also a microprocessor, a data processor and the like.

For example, the types of the circuit modules, the configuration of the bus of the microcomputer, the kinds of events output by the circuit modules, the detail of an operation to respond to a direction for start, etc. may be changed appropriately.

What is claimed is:

1. A data processor comprising:
    a central processing unit configured to execute instructions;
    a plurality of circuit modules operatively coupled to the central processing unit and each configured to output one of a plurality of event signals;
    a first controller configured to output an interrupt request to the central processing unit based on a selected one of the event signals; and
    a second controller configured to output a start control signal to a first circuit module of said plurality of circuit modules based on the event signal generated from a second circuit module of the plurality of circuit modules, said second controller including
    a multiplexer;
    an operation select circuit;
    a connection set register; and
    an operation set register,
    wherein the multiplexer includes inputs to receive the event signals, and an output to output one of the event signals selected from among the received event signals based on a value of the connection set register,
    wherein the operation select circuit outputs to the start control signal as one of a first and a second start control output signal to the first circuit module which causes the first circuit module to perform a given operation when the operation select circuit receives the selected event signal,
    wherein the first circuit module is configured to perform a plurality of functions, and
    wherein the second control signal is used for selecting one of the plurality of functions, and the first start control signal is used for a start signal of the selected function.

2. The data processor of claim 1,
    wherein the second controller has an event enable register, and
    wherein the event enable register is used to store information for data disabling of outputs of the multiplexers depending on a value of said stored information.

3. The data processor of claim 2,
    wherein the first controller has an interrupt enable flag, and
    wherein the interrupt enable flag is used to store information for a request which disables outputs of the first controller depending on a value of said stored information.

4. The data processor of claim 1,
    wherein settings of the connection set register and the operation set register are set by the central processing unit.

* * * * *